US012316006B2

(12) United States Patent
Jang et al.

(10) Patent No.: US 12,316,006 B2
(45) Date of Patent: May 27, 2025

(54) ANTENNA AND ELECTRONIC DEVICE INCLUDING THE SAME

(71) Applicant: SAMSUNG ELECTRONICS CO., LTD., Suwon-si (KR)

(72) Inventors: Woomin Jang, Suwon-si (KR); Hosaeng Kim, Suwon-si (KR); Seongjin Park, Suwon-si (KR); Sumin Yun, Suwon-si (KR); Jehun Jong, Suwon-si (KR); Jaehoon Jo, Suwon-si (KR); Jinwoo Jung, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 17/687,882

(22) Filed: Mar. 7, 2022

(65) Prior Publication Data

US 2023/0411869 A1 Dec. 21, 2023

Related U.S. Application Data

(63) Continuation of application No. PCT/KR2022/003038, filed on Mar. 3, 2022.

(30) Foreign Application Priority Data

Mar. 9, 2021 (KR) ........................ 10-2021-0030878

(51) Int. Cl.
*H01Q 21/06* (2006.01)
*H01Q 1/24* (2006.01)
*H01Q 1/38* (2006.01)

(52) U.S. Cl.
CPC ........... *H01Q 21/065* (2013.01); *H01Q 1/243* (2013.01); *H01Q 1/38* (2013.01)

(58) Field of Classification Search
CPC ...... H01Q 21/065; H01Q 1/38; H01Q 1/2283; H01Q 1/243
See application file for complete search history.

(56) References Cited

U.S. PATENT DOCUMENTS 8,384,596 B2 * 2/2013 Rofougaran ......... H01Q 9/0407 343/702
9,472,859 B2 * 10/2016 Dang ................. H01Q 21/0075
(Continued)

FOREIGN PATENT DOCUMENTS

KR 10-2019-0105546 9/2019
KR 10-2137093 7/2020
(Continued)

OTHER PUBLICATIONS

International Search Report for PCT/KR2022/003038 dated Jun. 13, 2022 and English translation, 6 pages.
(Continued)

*Primary Examiner* — Hasan Islam
(74) *Attorney, Agent, or Firm* — Nixon & Vanderhye P.C.

(57) ABSTRACT

According to various embodiments, an electronic device may include: a housing, an antenna structure disposed in the inner space of the housing, wherein the antenna structure includes: a substrate including a first substrate and a second substrate surface oriented in a direction opposite to the first substrate surface, and a first array antenna including a plurality of first chip antennas disposed at a specified interval in a first region of the first substrate surface, and a first wireless communication circuit disposed in the inner space and configured to transmit and/or receive a wireless signal of a first frequency band via the first array antenna.

19 Claims, 25 Drawing Sheets

(56) References Cited

U.S. PATENT DOCUMENTS

| | | | | |
|---|---|---|---|---|
| 10,594,019 | B2 * | 3/2020 | Baks | H01Q 9/045 |
| 11,276,926 | B2 | 3/2022 | Yun et al. | |
| 2017/0229783 | A1 | 8/2017 | Liu et al. | |
| 2019/0267710 | A1 | 8/2019 | Jenwatanavet et al. | |
| 2019/0288372 | A1 | 9/2019 | Chen et al. | |
| 2020/0153086 | A1 | 5/2020 | Park et al. | |
| 2020/0259267 | A1 | 8/2020 | Park et al. | |
| 2020/0259269 | A1 | 8/2020 | Kim et al. | |
| 2020/0365973 | A1 | 11/2020 | Jeon et al. | |
| 2020/0373647 | A1 | 11/2020 | Lee | |
| 2021/0036403 | A1 | 2/2021 | Lin et al. | |
| 2021/0044001 | A1 | 2/2021 | Kang et al. | |
| 2021/0210869 | A1 | 7/2021 | Lee et al. | |

FOREIGN PATENT DOCUMENTS

| | | | |
|---|---|---|---|
| KR | 10-2020-0097621 | | 8/2020 |
| KR | 10-2020-0117962 | | 10/2020 |
| KR | 10-2021-0015559 | A | 2/2021 |
| KR | 10-2419622 | B1 | 7/2022 |

OTHER PUBLICATIONS

Written Opinion of the International Searching Authority for PCT/KR2022/003038 dated Jun. 13, 2022 and English translation, 8 pages.

Extended European Search Report dated Mar. 11, 2024 issued in European Patent Application No. 22767400.9.

* cited by examiner

ANTENNA AND ELECTRONIC DEVICE INCLUDING THE SAME

CROSS-REFERENCE TO RELATED APPLICATIONS

This application is a continuation of International Application No. PCT/KR2022/003038 designating the United States, filed on Mar. 3, 2022, in the Korean Intellectual Property Receiving Office and claiming priority to Korean Patent Application No. 10-2021-0030878, filed on Mar. 9, 2021, in the Korean Intellectual Property Office, the disclosures of which are incorporated by reference herein in their entireties.

BACKGROUND

Field

The disclosure relates to an antenna and an electronic device including the same.

Description of Related Art

With the development of wireless communication technology, electronic devices (e.g., electronic devices for communication) are commonly used in daily life, and thus use of contents is increasing exponentially. Due to the rapid increase of use of contents, network capacity is gradually reaching the limit thereof. After the commercialization of 4G (4th generation) communication systems, in order to meet the increasing demand for wireless data traffic, communication systems (e.g., a 5G (5th generation) communication system, a pre-5G communication system, or a new radio (NR)) that transmit and/or receive signals using a frequency of a high-frequency (e.g., the mmWave) band (e.g., a band in the range of 3 GHz to 300 GHz)) are being researched.

The next-generation wireless communication technology can actually transmit and receive wireless signals substantially using the mmWave band (e.g., a frequency band in the range of about 3 GHz to 100 GHz). An efficient mounting structure and a new antenna structure (e.g., an antenna module) corresponding thereto are being developed in order to overcome a high free-space loss due to frequency characteristics and to increase the gain of an antenna. The antenna structure may include an array antenna in which a variable number of antenna elements (e.g., conductive patches and/or conductive patterns) are disposed at regular intervals. These antenna elements may be disposed such that a beam pattern is formed in any one direction inside the electronic device. For example, the antenna structure may be disposed such that a beam pattern is formed toward at least a portion of the front surface, the rear surface, and/or the side surface in the inner space of the electronic device.

The electronic device may include an antenna that is disposed in the inner space and operates in a high-frequency band different from that of the above-described array antenna for fast short-range wireless communication with an external electronic device disposed nearby, and may be set to form a beam pattern in a specific direction. For example, the short-range communication may include 802.11ay, which is a type of LAN of a wireless LAN (WLAN) IEEE 802.11 set. 802.11ay is being developed as the next-generation short-range wireless communication because it uses a relatively wider bandwidth (about 8.64 GHz) than other short-range communication in a high-frequency band (e.g., about 60 GHz).

However, when the antenna structure operating in the mmWave band and the antenna structure operating in the 802.11ay band are separately configured and disposed in the inner space of the electronic device, it goes against the trend of slimming of electronic devices, and design restrictions of other electronic components may occur due to securing a space for arrangement of antenna structures.

SUMMARY

Embodiments of the disclosure provide an antenna configured to modularize antennas operating in different high frequency bands into one structure, and an electronic device including the same.

Embodiments of the disclosure provide an antenna capable of contributing to slimming of an electronic device and an electronic device including the same.

Embodiments of the disclosure provide an antenna structure configured to operate in both an mmWave band and an 802.11ay band, and an electronic device including the same.

According to various example embodiments, an electronic device may include: a housing, an antenna structure disposed in the inner space of the housing, wherein the antenna structure includes: a substrate including a first substrate surface and a second substrate surface oriented in a direction opposite to the first substrate surface, and a first array antenna including a plurality of first chip antennas disposed at a specified interval in a first region of the first substrate surface, and a first wireless communication circuit disposed in the inner space and configured to transmit and/or receive a wireless signal of a first frequency band via the first array antenna.

The antenna structure according to various example embodiments of the disclosure can be helpful for slimming an electronic device and for increasing the degree of freedom of mounting for peripheral electronic components by disposing at least some of a plurality of antenna elements included in a first array antenna, which operates in a first high-frequency band (e.g., mmWave band), and a second array antenna, which operates in a second high frequency band (e.g., 802.11ay band), on a single substrate in the form of a chip antenna.

In addition, various effects directly or indirectly identified through disclosure may be provided.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
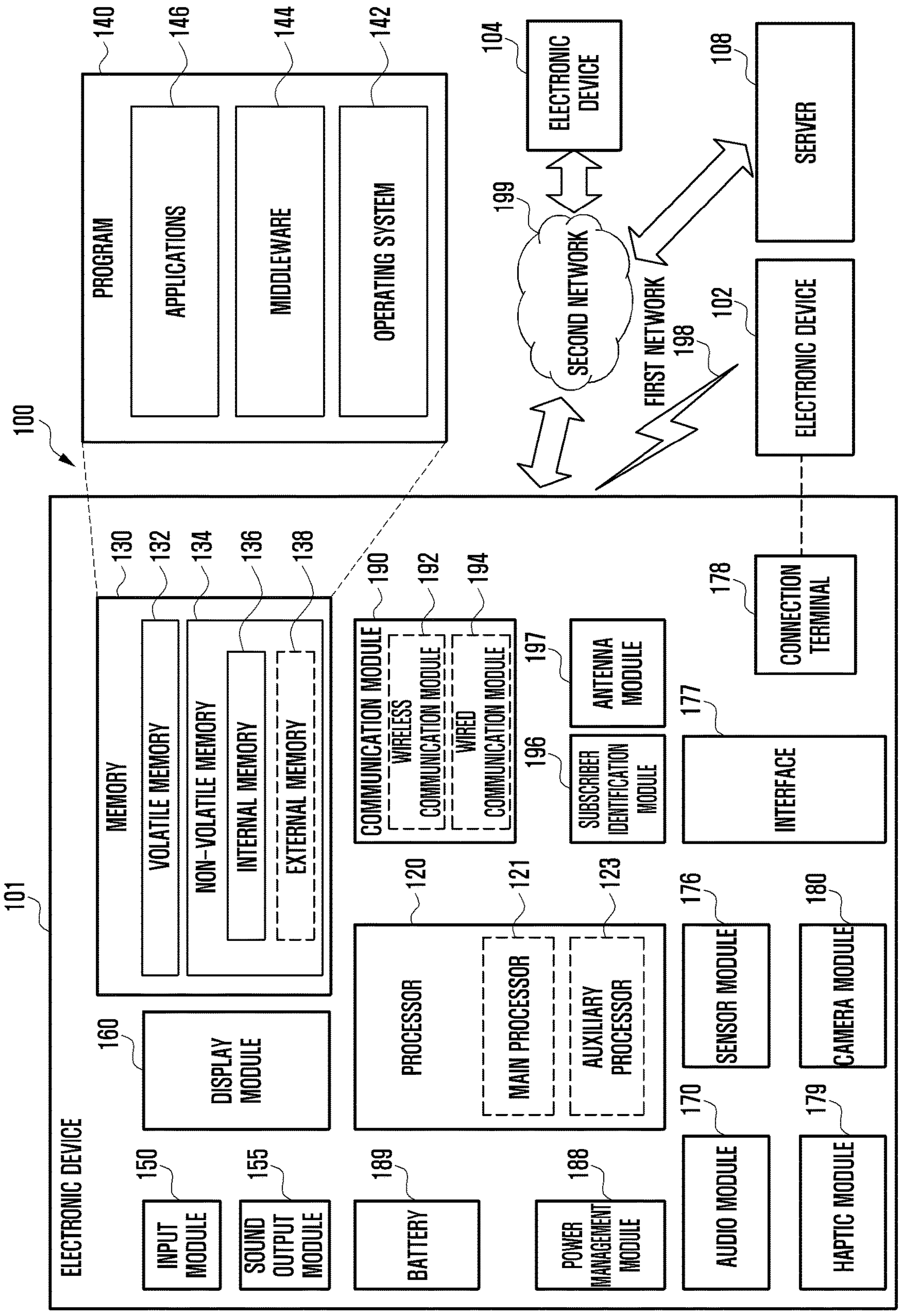
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
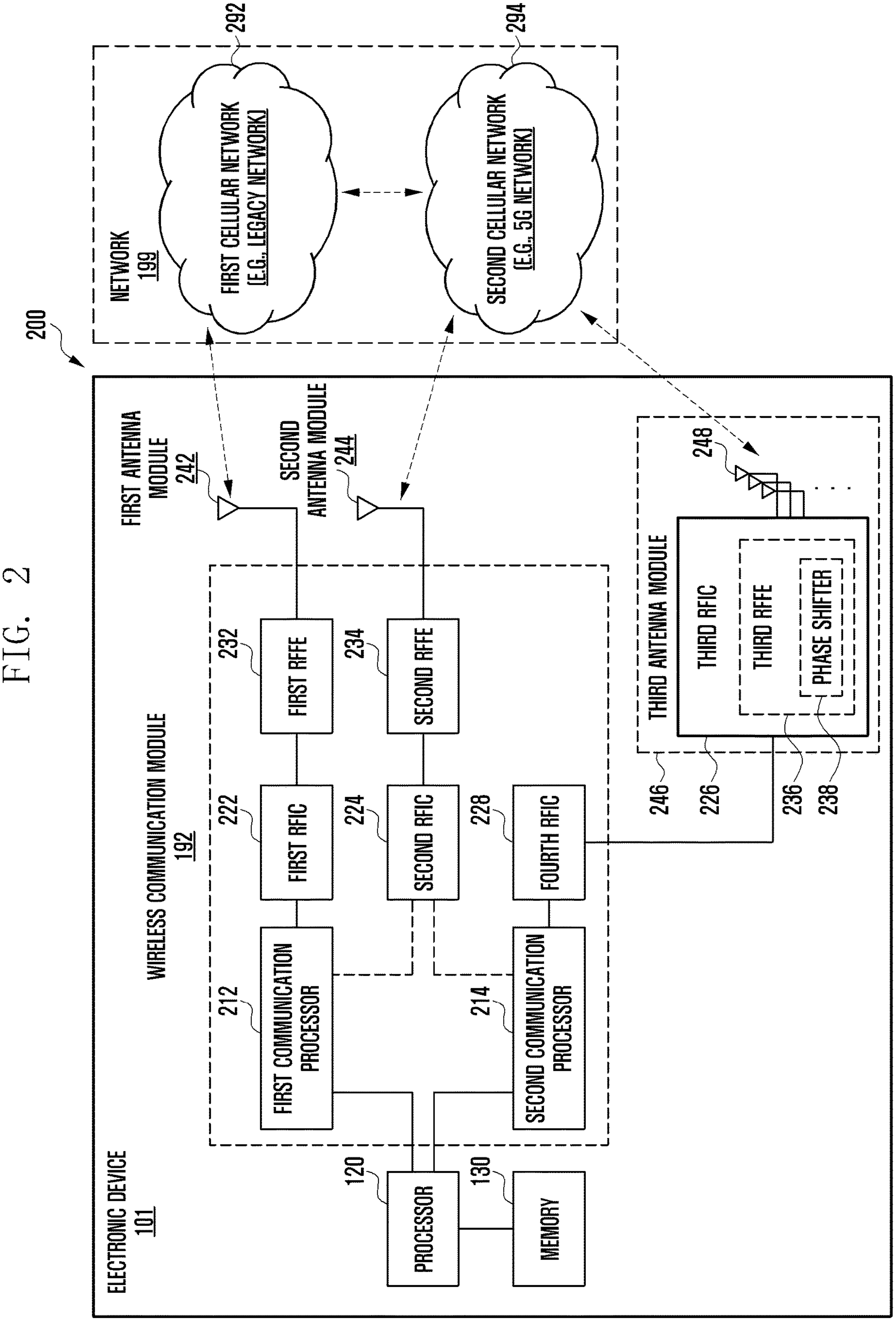
FIG. 2 is a block diagram illustrating an example configuration of an electronic device configured to support a legacy network communication and a 5G network communication, according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
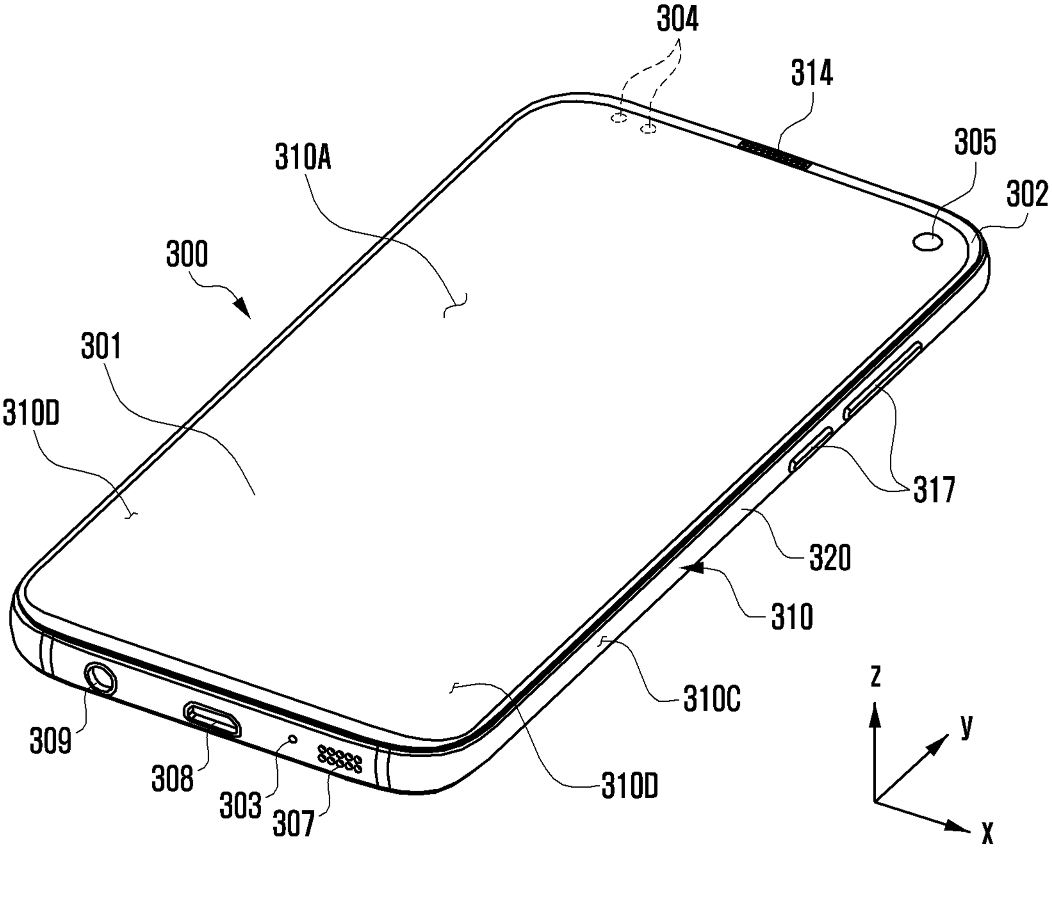
FIG. 3A is a front perspective view of a mobile electronic device according to various embodiments.
Figure 3B:
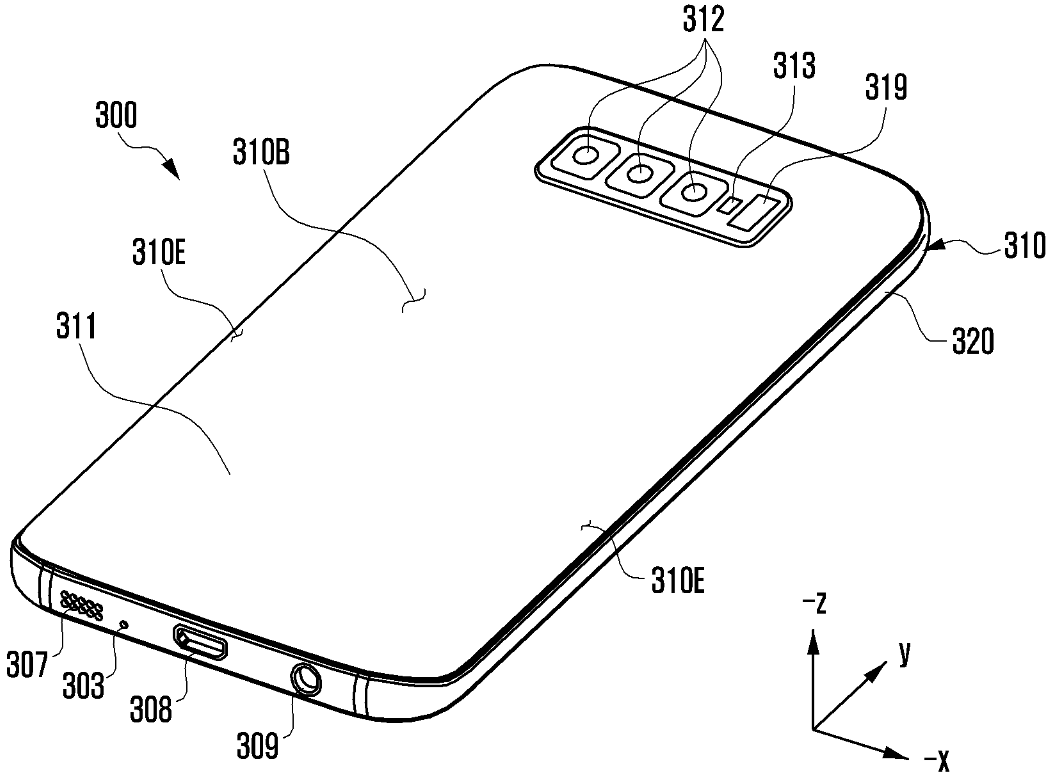
FIG. 3B is a rear perspective view of the mobile electronic device according to various embodiments.

FIG. 3A is a front perspective view of a mobile electronic device according to various embodiments, and FIG. 3B is a rear perspective view of the mobile electronic device shown in FIG. 3A according to various embodiments.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") which is combined with the front plate 302 and the rear plate 311 and includes a metal and/or polymer. The rear plate 311 and the lateral bezel structure may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
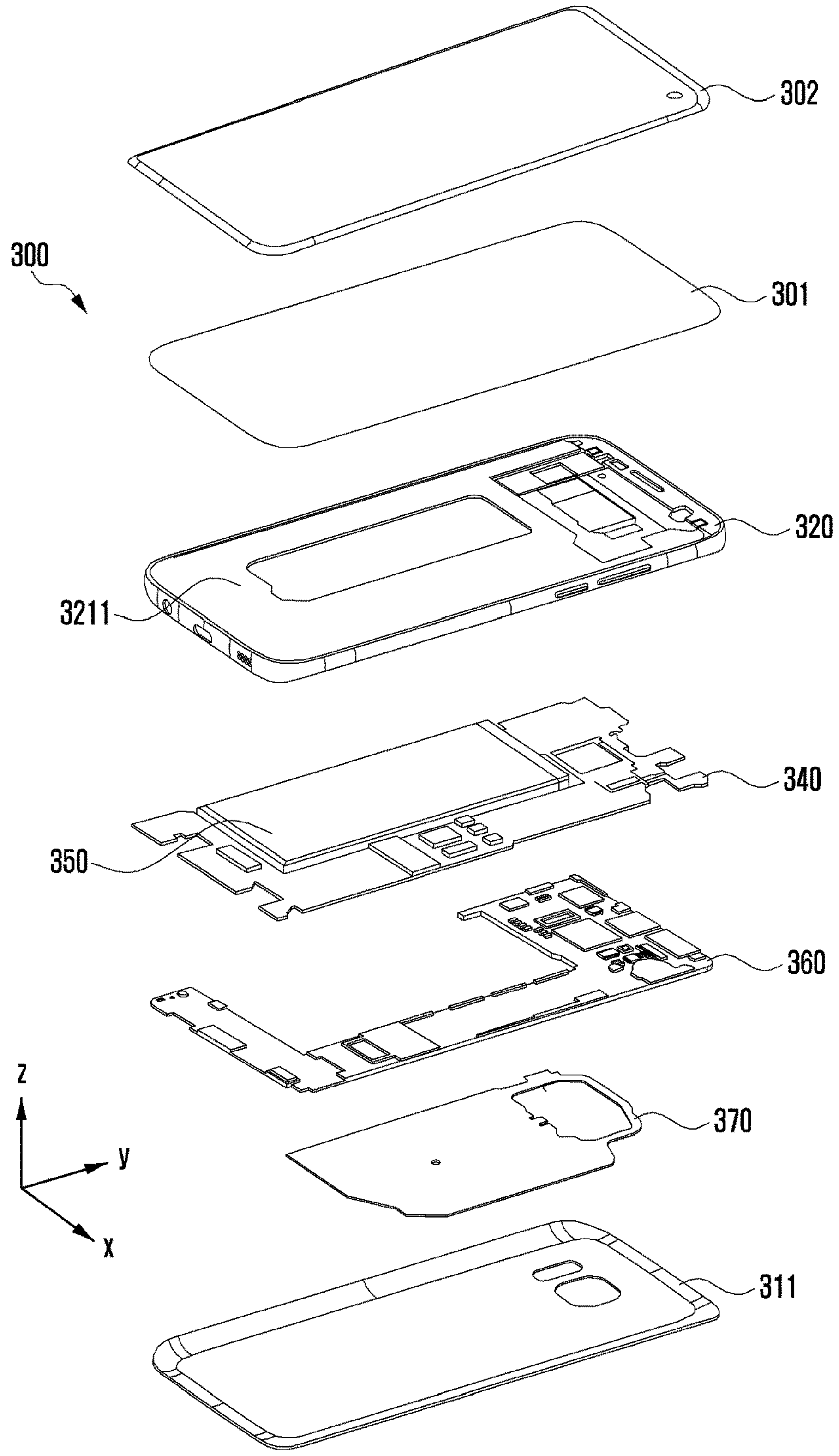
FIG. 3C is an exploded perspective view of the mobile electronic device according to various embodiments.

FIG. 3C is an exploded perspective view illustrating the mobile electronic device shown in FIG. 3A according to various embodiments.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3*a* or FIG. 3*b*, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
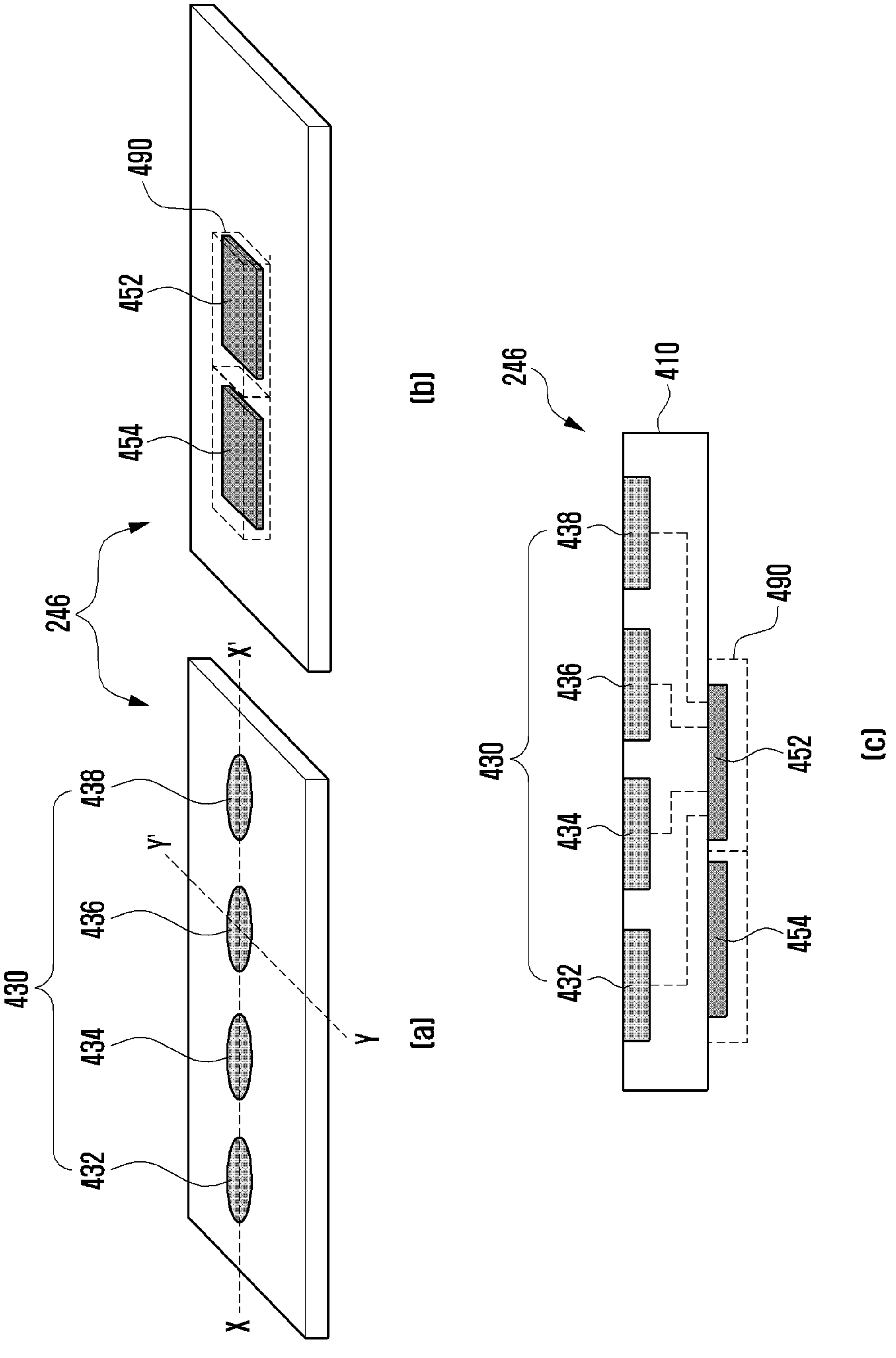
FIG. 4A is a diagram illustrating an example structure of a third antenna module described with reference to FIG. 2 according to various embodiments.

FIG. 4A is a diagram illustrating an example structure of, for example, a third antenna module described with reference to FIG. 2 according to various embodiments. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in an embodiment, the third antenna module 246 may include a printed circuit board 410, an antenna array 430, a RFIC 452, and a PMIC 454. The third antenna module 246 may further include a shield member 490. In various embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to an embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to an embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to an embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
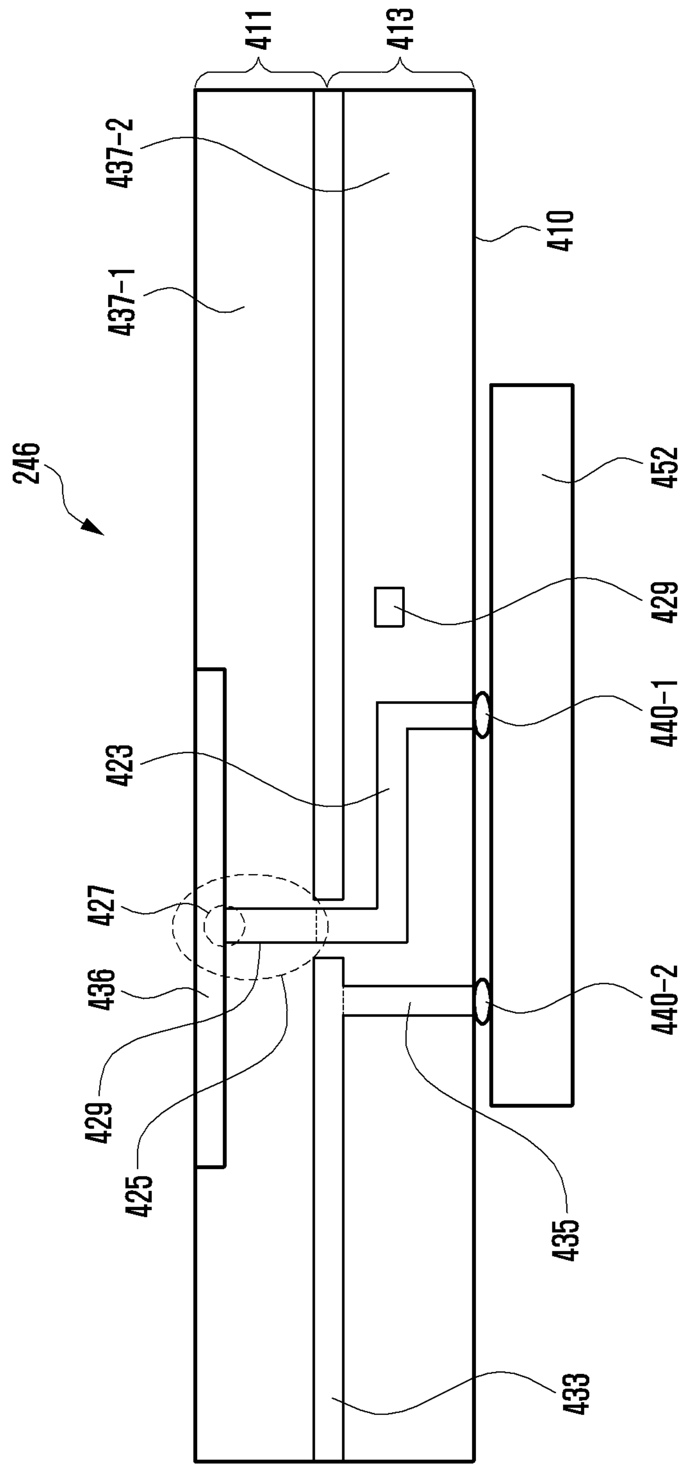
FIG. 4B is a cross-sectional view of the third antenna module illustrated in FIG. 4A taken along line Y-Y' according to various embodiments.

FIG. 4B is a cross-sectional view illustrating the third antenna module 246 taken along line Y-Y' of FIG. 4A(a) according to various embodiments. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In various embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
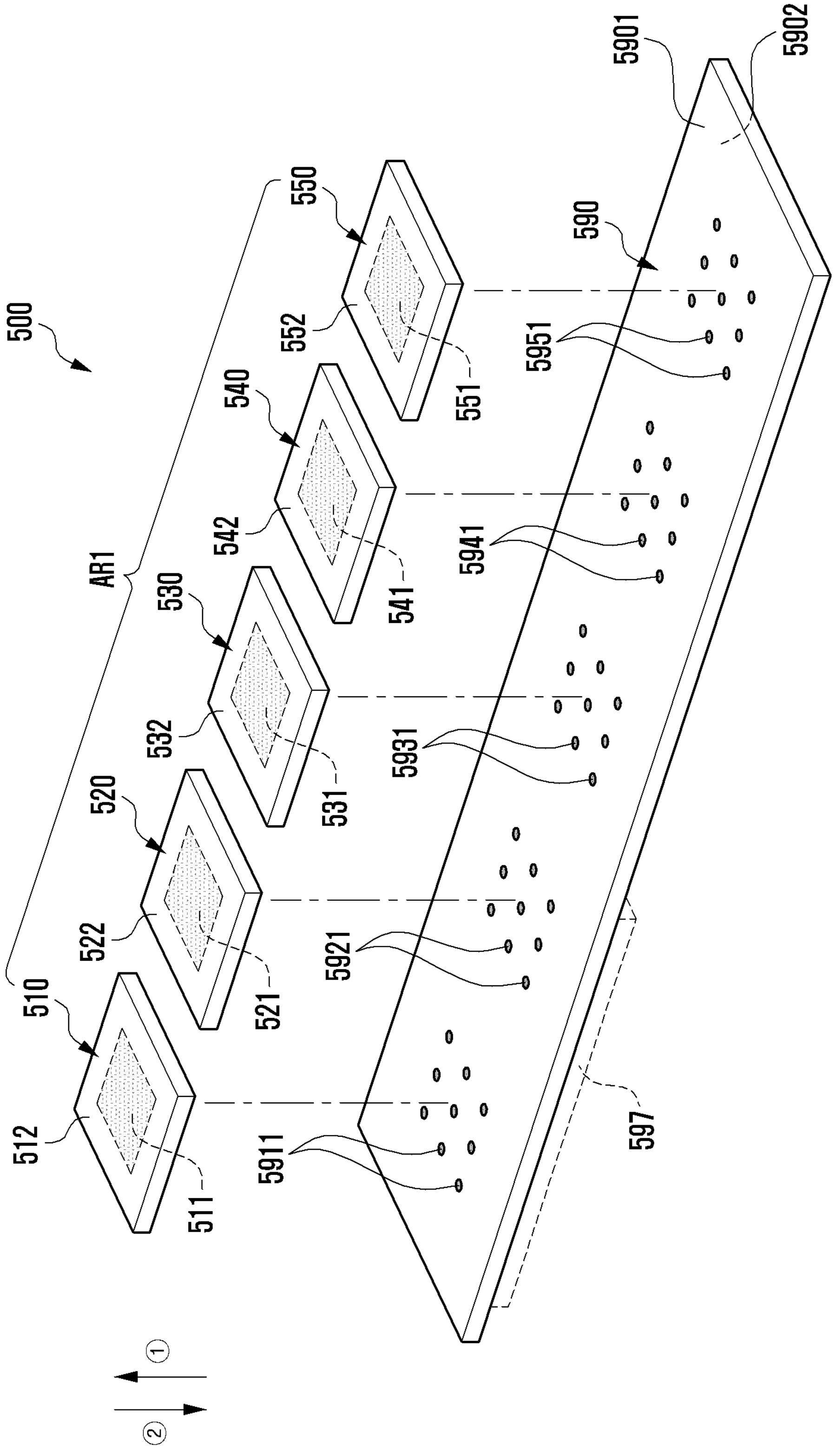
FIG. 5A is an exploded perspective view of an antenna structure in a disassembled state according to various embodiments.
Figure 5B:
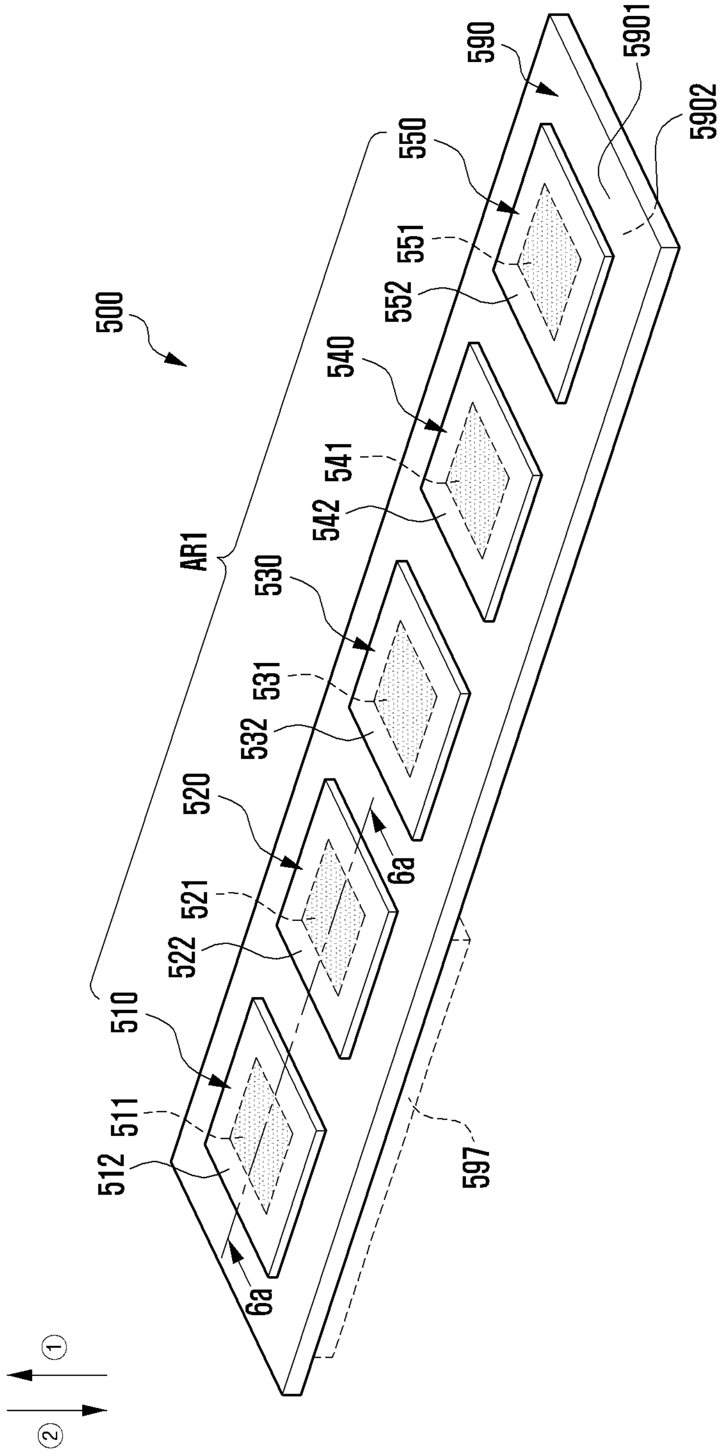
FIG. 5B is a perspective view of the antenna structure in an assembled state according to various embodiments.
Figure 5C:
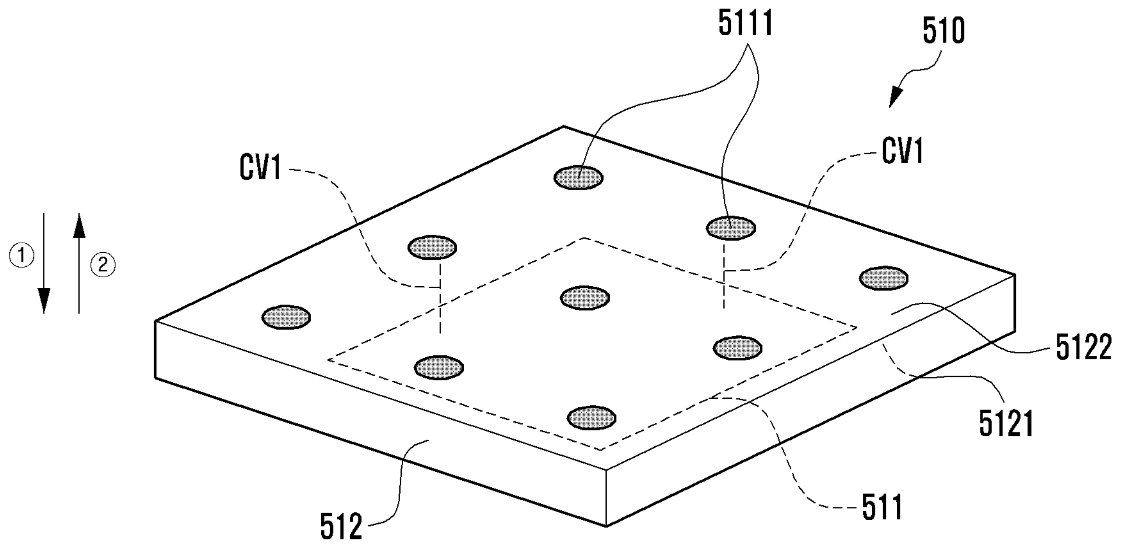
FIG. 5C is a rear perspective view of a first chip antenna according to various embodiments.

FIG. 5A is an exploded perspective view of an antenna structure in a disassembled state according to various embodiments. FIG. 5B is a perspective view of the antenna structure in an assembled state according to various embodiments. FIG. 5C is a rear perspective view of a first chip antenna according to various embodiments.

The antenna structure 500 of FIGS. 5A and 5B may be at least partially similar to the third antenna module 246 of FIG. 2, or may further include various embodiments of the antenna structure.

Referring to FIGS. 5A and 5B, the antenna structure 500 (e.g., an antenna module) may include an array antenna ARI including a plurality of chip antennas 510, 520, 530, 540, and 550. According to an embodiment, the plurality of chip antennas 510, 520, 530, 540, and 550 may be disposed on a substrate 590 (e.g., a printed circuit board) to have a predetermined (e.g., specified) interval through a surface mount device (SMD) method. According to an embodiment, the substrate 590 may include a first substrate surface 5901 oriented in a first direction (direction ①) and a second substrate surface 5902 oriented in a second direction (direction ②) opposite to the first substrate surface 5901. According to an embodiment, the plurality of chip antennas 510, 520, 530, 540, and 550 may be disposed through the first substrate surface 5901. For example, the plurality of chip antennas 510, 520, 530, 540, and 550 may be electrically connected to the substrate 590 through an electrical bonding process such as soldering through the first substrate surface 5901. According to an embodiment, the antenna structure 500 may be disposed in the inner space (e.g., the inner space 7001 in FIG. 9B) of the electronic device (e.g., the electronic device 700 in FIG. 9B) such that the first substrate surface 5901 of the substrate 590 faces at least a portion of the side surface (e.g., side surface 310C in FIG. 3A) of the housing (e.g., the housing 710 in FIG. 9B).

According to various embodiments, the array antenna AR1 may include a first chip antenna 510 disposed in an inner space of a first rigid body 512 and including a first conductive patch 511 as an antenna element, a second chip antenna 520 disposed in an inner space of a second rigid body 522 and including a second conductive patch 521 as an antenna element, a third chip antenna 530 disposed in an inner space of a third rigid body 532 and including a third conductive patch 531 as an antenna element, a fourth chip antenna 540 disposed in an inner space of a fourth rigid body 542 and including a fourth conductive patch 541 as an antenna element, and a fifth chip antenna 550 disposed in an inner space of a fifth rigid body 552 and including a fifth conductive patch 551 as an antenna element. According to an embodiment, the rigid bodies 512, 522, 532, 542, and 552 may be made of a material (e.g., a ceramic material) having a high dielectric constant (e.g., a dielectric constant in the range of 4 to 7). According to an embodiment, the conductive patches 511, 521, 531, 541, and 551 may be replaced with conductive patterns disposed on the rigid bodies 512, 522, 532, 542, and 552, respectively.

Referring to FIGS. 5C and 5A, the first chip antenna 510 may include a first rigid body 512 made of a high-dielectric constant material and a first conductive patch 511 disposed in the inner space of the first rigid body 512. According to an embodiment, the first rigid body 512 may include a first rigid body surface 5121 oriented in the first direction (direction ①) which is the same as the first substrate surface 5901 and a second rigid body surface 5122 oriented in a direction (② direction) opposite to the first rigid body surface 5121 and facing the first substrate surface 5901. In an embodiment, the first conductive patch 511 may be disposed at a position adjacent to the first rigid body surface 5121 in the inner space of the first rigid body 512. In some embodiments, the first conductive patch 511 may be disposed to be exposed to the outside on the first rigid surface 5121. According to an embodiment, the first chip antenna 510 may include at least one first conductive pad 5111 disposed on the second rigid surface 5122 to be exposed to the outside. According to an embodiment, the at least one first conductive pad 5111 may be electrically connected to the first conductive patch 511. According to an embodiment, at least a portion of the at least one first conductive pad 5111 may be electrically connected to the first conductive patch 511 via an electrical connection structure for feeding (e.g., the first electrical connection structure CV1 in FIG. 6) (e.g., a conductive via for feeding). In this case, the first conductive patch 511 may be used as a portion of the array antenna AR1, which operates as a single polarization or double polarization through at least one first conductive pad 5111 and an electrical connection structure (e.g., the first electrical connection structure CV1 in FIG. 6). According to an embodiment, at least a portion of the at least one first conductive pad 5111 may be electrically connected to a ground layer (e.g., the ground layer G1 in FIG. 6) of the substrate 590 via an electrical connection structure for grounding (e.g., the third electrical connection structure CV4 in FIG. 6) (e.g., a conductive via for grounding). According to an embodiment, the second to fifth chip antennas 520 to 550 may also have substantially the same arrangement structure as the first chip antenna 510.

According to various embodiments, the substrate 590 may include at least one second conductive pad 5911 disposed to be exposed to the first substrate surface 5901. According to an embodiment, the at least one second conductive pad 5911 may be disposed to be exposed to the first substrate surface 5901 of the substrate 590 and may be electrically connected to at least one first conductive pad 5111 when the first chip antenna 510 is disposed on the first substrate surface 5901. According to an embodiment, at least a portion of the at least one second conductive pad 5911 may be electrically connected to a wireless communication circuit 597 disposed on the second substrate surface 5902 via an electrical connection structure (e.g., a conductive via or a wiring structure) disposed in the inner space of the substrate 590. In some embodiments, at least a portion of the at least one second conductive pad 5911 may be electrically connected to a connector (not illustrated) disposed on the second substrate surface 5902 via an electrical connection structure disposed in the inner space of the substrate 590. In this case, the wireless communication circuit 597 may be disposed in the inner space (e.g., the inner space 7001 in FIG. 9B) of the electronic device (e.g., the electronic device 700 in FIG. 9B) at a position (e.g., a main board) other than the substrate 590 and may be electrically connected to a connector disposed on the second substrate surface 5902 via an electrical connection member (e.g., an FPCB). According to an embodiment, the at least one first conductive pad 5111 and the at least one second conductive pad 5911 may be electrically connected to each other through a soldering process. According to an embodiment, the second chip antenna 520, the third chip antenna 530, the fourth chip antenna 540, or the fifth chip antenna 550 may also have substantially the same structure as the first chip antenna 510 and may be disposed on the substrate 590 in the same manner and may be electrically connected to the conductive pads 5921, 5931, 5941, and 5951 disposed to be exposed to the first substrate surface 5901 of the substrate 590. According to an embodiment, the wireless communication circuit 597 may be configured to transmit and/or receive a radio frequency in the range of about 3 GHz to about 100 GHz through the array antenna AR1. According to an embodiment, the wireless communication circuit 597 may be set to operate in a frequency band in the range of about 25 GHz to 45 GHZ (e.g., mmWave band) via the array antenna AR1. In various embodiments, the wireless communication circuit 597 may be configured to operate in a frequency band of about 60 GHz (e.g., 802.11ay band) via the array antenna AR1. In various embodiments, the wireless communication circuit 597 may be disposed in the inner space (e.g., the inner space 7001 in FIG. 9B) of the electronic device (e.g., the electronic device 700 in FIG. 9B) at a position spaced apart from the substrate 590 and may be electrically connected to the substrate 590 via an electrical connection member (e.g., an FPCB). For example, the wireless communication circuit 597 may be disposed on a main board (e.g., the main board 760 in FIG. 9B) of the electronic device (e.g., the electronic device 700 in FIG. 9B).

In various example embodiments of the disclosure, an antenna structure 500 in which five chip antennas 510, 520, 530, 540, and 550 are disposed on a substrate 590 and operate as an array antenna AR1 has been illustrated and described, but the disclosure is not limited thereto. For example, the antenna structure 500 may include two, three, four, or six or more chip antennas disposed on the substrate 590 and operated as the array antenna AR1. In various embodiments, the antenna structure 500 may be operated as a dual polarization array antenna by including additional feeding points at which the conductive patches 511, 521, 531, 541, and 551 included in the plurality of chip antennas 510, 520, 530, 540, and 550 are disposed via the electrical connection structure of the at least one first conductive pad 5111 and the at least one second conductive pad 5911.

Figure 6A:
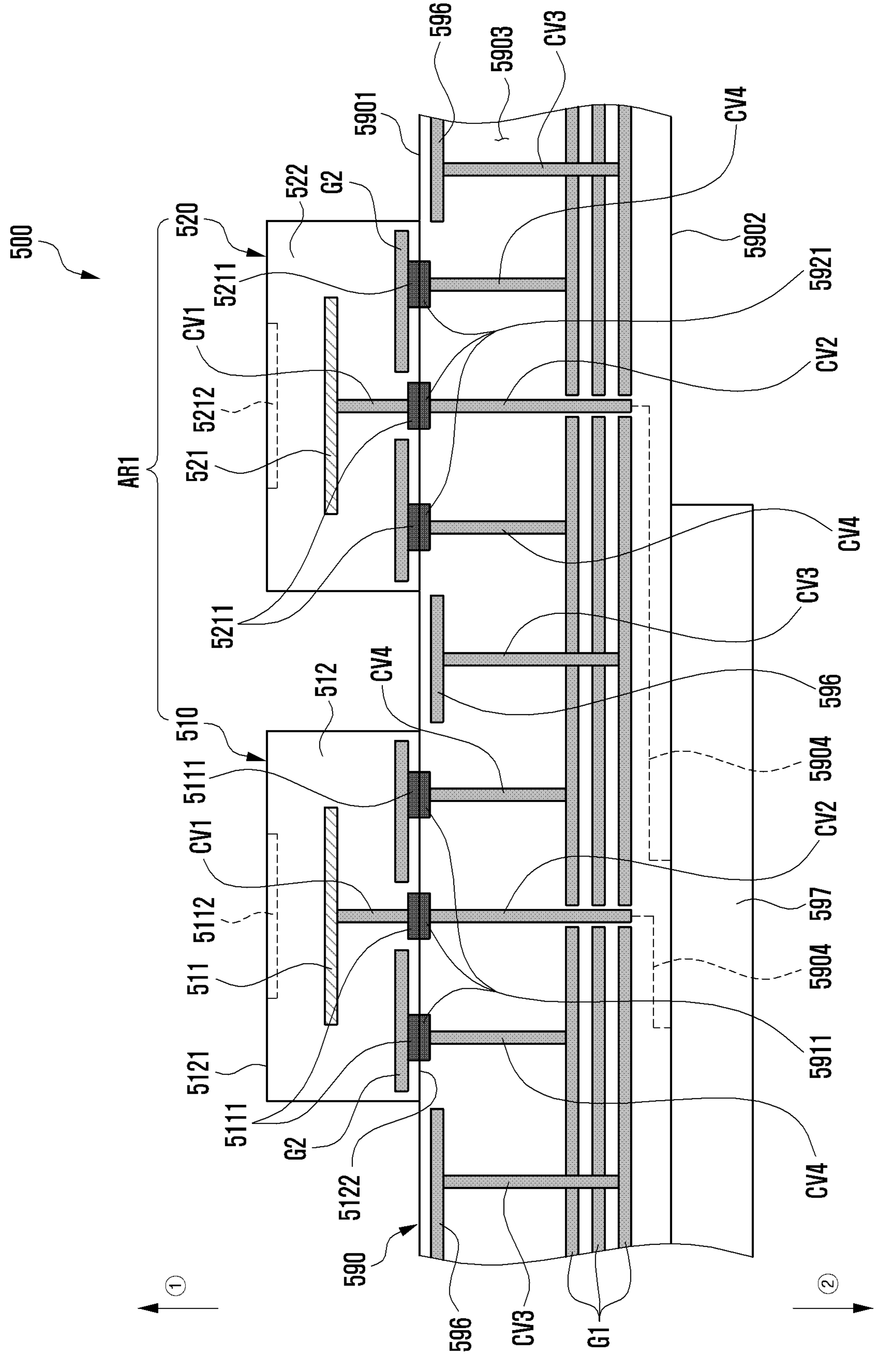
FIG. 6A is a partial cross-sectional view of the antenna structure taken along line 6*a*-6*a* in FIG. 5B according to various embodiments.

FIG. 6A is a partial cross-sectional view of the antenna structure taken along line 6*a*-6*a* in FIG. 5B according to various embodiments.

Although FIG. 6A illustrates the arrangement structure of the first chip antenna 510 and the second chip antenna 520 disposed on the substrate 590, the remaining chip antennas 530, 540, and 550 disposed on the substrate 590 may also have substantially the same arrangement structure.

Referring to FIG. 6A, the antenna structure 500 may include a substrate 590 including a plurality of insulating layers 5903 and, as an array antenna AR1, a first chip antenna 510 and a second chip antenna 520 disposed on the substrate 590. According to an embodiment, the substrate 590 may include a first substrate surface 5901 oriented in the first direction (direction ①) and a second substrate surface 5902 oriented in a direction (direction ②) opposite to the first substrate surface 5901. According to an embodiment, the substrate 590 may include a ground layer G1 disposed on at least some of the plurality of insulating layers 5903.

According to various embodiments, the first chip antenna 510 may include a first rigid body 512 made of a high-dielectric material (e.g., ceramic), a first conductive patch 511 disposed in the inner space of the first rigid body 512, and a ground layer G2 disposed between the first conductive patch 511 and the substrate 590 in the inner space of the first rigid body 512. According to an embodiment, the first rigid body 512 may include a material having a dielectric constant in the range of 4 to 9. For example, the first rigid body 512 may include a substrate made of a ceramic material (e.g., low-temperature co-fired ceramic (LLCC)) having a higher dielectric constant than the substrate 590 (e.g., a printed circuit board). According to an embodiment, the second chip antenna 520 may include a second rigid body 522 made of a high-dielectric material (e.g., ceramic), a second conductive patch 521 disposed in the inner space of the second rigid body 522, and a ground layer G2 disposed between the second conductive patch 521 and the substrate 590 in the inner space of the second rigid body 522. According to an embodiment, the first conductive patch 511 may be electrically connected to the at least one first conductive pad 5111 exposed to the second rigid body surface 5122 via the first electrical connection structure CV1 in the inner space of the first rigid body 512. According to an embodiment, the second conductive patch 521 may also be electrically connected to the at least one conductive pad 5211 exposed to the outer surface of the second rigid body surface 522 via the first electrical connection structure CV1 in the inner space of the second rigid body 522. According to an embodiment, the first electrical connection structure CV1 may include a conductive via.

According to various embodiments, the substrate 590 may include at least one second conductive pad 5911 disposed to be exposed to the first substrate surface 5901. According to an embodiment, the at least one second conductive pad 5911 may be electrically connected to the wireless communication circuit 597 disposed on the second substrate surface 5902 via the second electrical connection structure CV2 and the wiring structure 5904 disposed in the insulating layer 5903 of the substrate 590. According to an embodiment, the at least one second conductive pad 5921 disposed to be exposed to the first substrate surface 5901 may also be electrically connected to the wireless communication circuit 597 in substantially the same manner. According to an embodiment, the ground layer G2 disposed in the inner space of the first rigid body 512 may be electrically connected to the ground layer G1 of the substrate 590 via the at least one first conductive pad 5111 exposed to the second rigid body surface 5122, the at least one second conductive pad 5911 disposed on the substrate 590, and a third electrical connection structure CV4 (e.g., a conductive via) disposed in the insulating layer 5903 of the substrate 590. Accordingly, when the first chip antenna 510 is disposed on the first substrate surface 5901 of the substrate 590, and the at least one first conductive pad 5111 is bonded to the at least one second conductive pad 5911 through soldering, the first conductive patch 511 may be electrically connected to the wireless communication circuit 597. According to an embodiment, the second conductive patch 521 may also be electrically connected to the wireless communication circuit 597 in substantially the same manner. According to an embodiment, the second electrical connection structure CV2 and/or the third electrical connection structure CV4 may have a conductive via at least partially formed in a vertical direction in the insulating layer 5903 of the substrate 590.

According to various embodiments, the antenna structure 500 may include conductive walls CV3 disposed between the chip antennas 510 and 520 on the substrate 590 and having a length in the vertical direction. According to an embodiment, the conductive walls CV3 may be helpful for improving isolation between the chip antennas 510 and 520. According to an embodiment, the antenna structure 500 may include a conductive layer 596 disposed to surround the chip antennas 510 and 520 on the substrate 590 when viewed from the top of the first substrate surface 5901. According to an embodiment, the conductive layer 596 may be helpful for reducing mutual interference between the chip antennas 510 and 520 and for reducing surface current flowing through the substrate surface. According to an embodiment, the conductive layer 596 may disposed in the insulating layer 5903 of the substrate 590 at a position close to (e.g., within a specified proximity) the first substrate surface 5901 or may be disposed in a manner of being exposed to the first substrate surface 5901. According to an embodiment, the conductive walls CV3 and the conductive layer 596 may be electrically connected to the ground layer G1 of the substrate 590. In various embodiments, the first chip antenna 510 may further include at least one conductive dummy patch 5112 disposed between the first rigid body surface 5901 and the first conductive patch 511 in the inner space of the first rigid body 512. According to an embodiment, the conductive dummy patch 5112 may be disposed to be spaced apart from the first conductive patch 511 at a predetermined interval so as to be capacitively coupled to the first conductive patch 511. According to an embodiment, the conductive dummy patch 5112 may have a smaller size than the first conductive patch 511. In various embodiments, the conductive dummy patch 5112 may have a size substantially equal to or larger than the first conductive patch 511. According to an embodiment, the conductive dummy patch 5112 may be helpful for expanding the bandwidth of the operating frequency band of the array antenna AR1 without degrading radiation performance. According to an embodiment, the second chip antenna 520 may also include a conductive dummy patch 5212 disposed inside the second rigid body 522 in substantially the same manner.

Figure 6B:
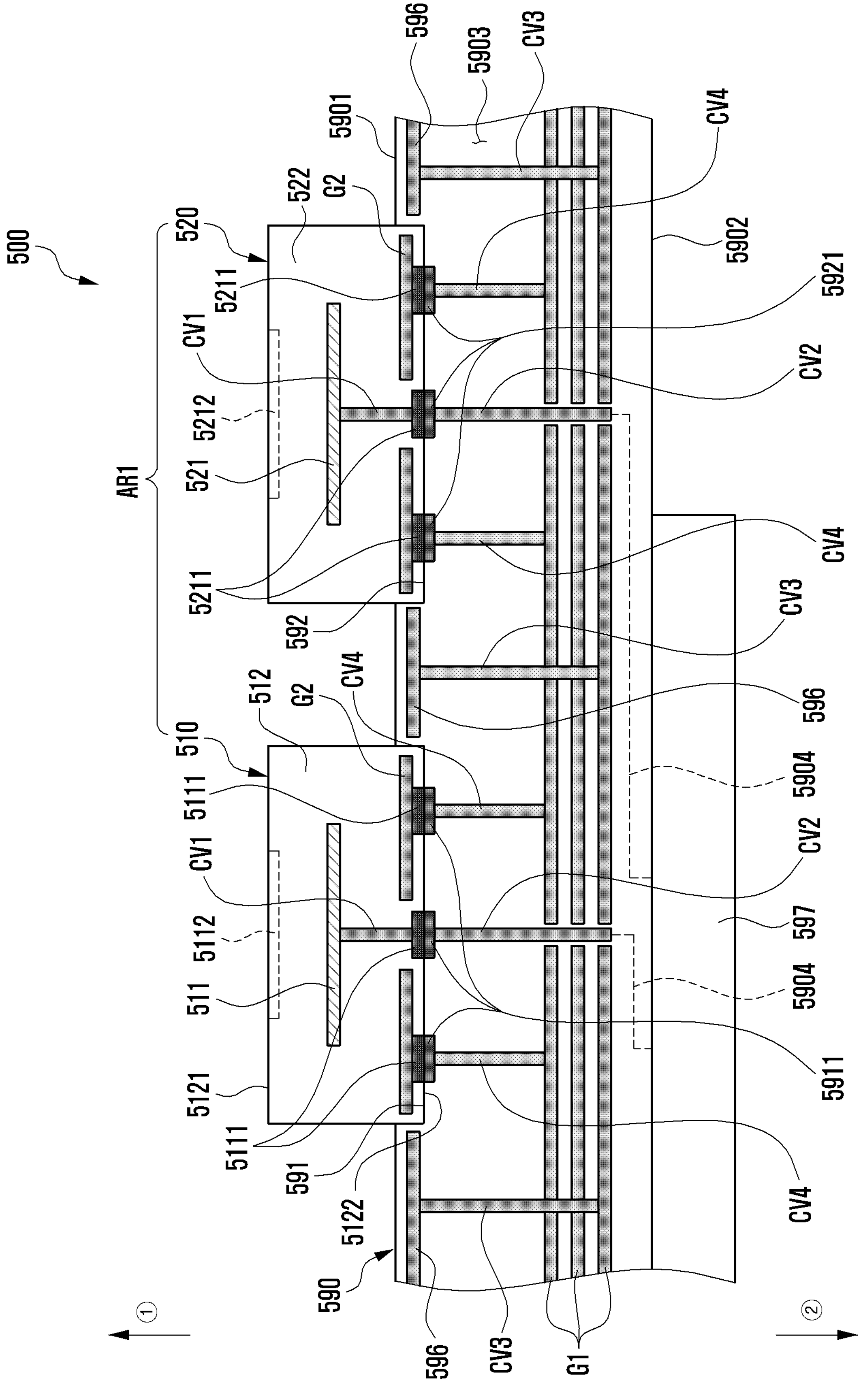
FIG. 6B is a partial cross-sectional view of the antenna structure according to various embodiments.

FIG. 6B is a partial cross-sectional view of the antenna structure according to various embodiments.

In describing the antenna structure of FIG. 6B, the same reference numerals are assigned to the components substantially the same as those of the antenna structure of FIG. 6A, and a detailed description thereof may not be repeated.

Referring to FIG. 6B, the substrate 590 may include a plurality of recesses 591 and 592, which are spaced apart from the first substrate surface 5901 by a predetermined interval and are formed to be lower than the first substrate surface 5901. According to an embodiment, the plurality of recesses 591 and 592 may include a first recess 591 configured to accommodate at least a portion of the first chip antenna 510 and a second recess 592 configured to accommodate at least a portion of the second chip antenna 520. According to an embodiment, one or more second conductive pads 5911 and 5921 may be disposed to be exposed to the outside in the first recess 591 and the second recess 592, respectively. According to an embodiment, since the plurality of chip antennas 510 and 520 are accommodated in the plurality of recesses 591 and 592, respectively, it may be helpful for alignment for electrical connection between the chip antennas 510 and 520 and the substrate 590 at the time of assembly, and the separation of the chip antennas 510 and 520 due to an external impact can be suppressed. Although not illustrated, the remaining chip antennas (e.g., the third chip antenna 530, the fourth chip antenna 540, and the fifth chip antenna 550 in FIG. 5A) may also be disposed on the substrate 590 in substantially the same manner.

Figure 7:
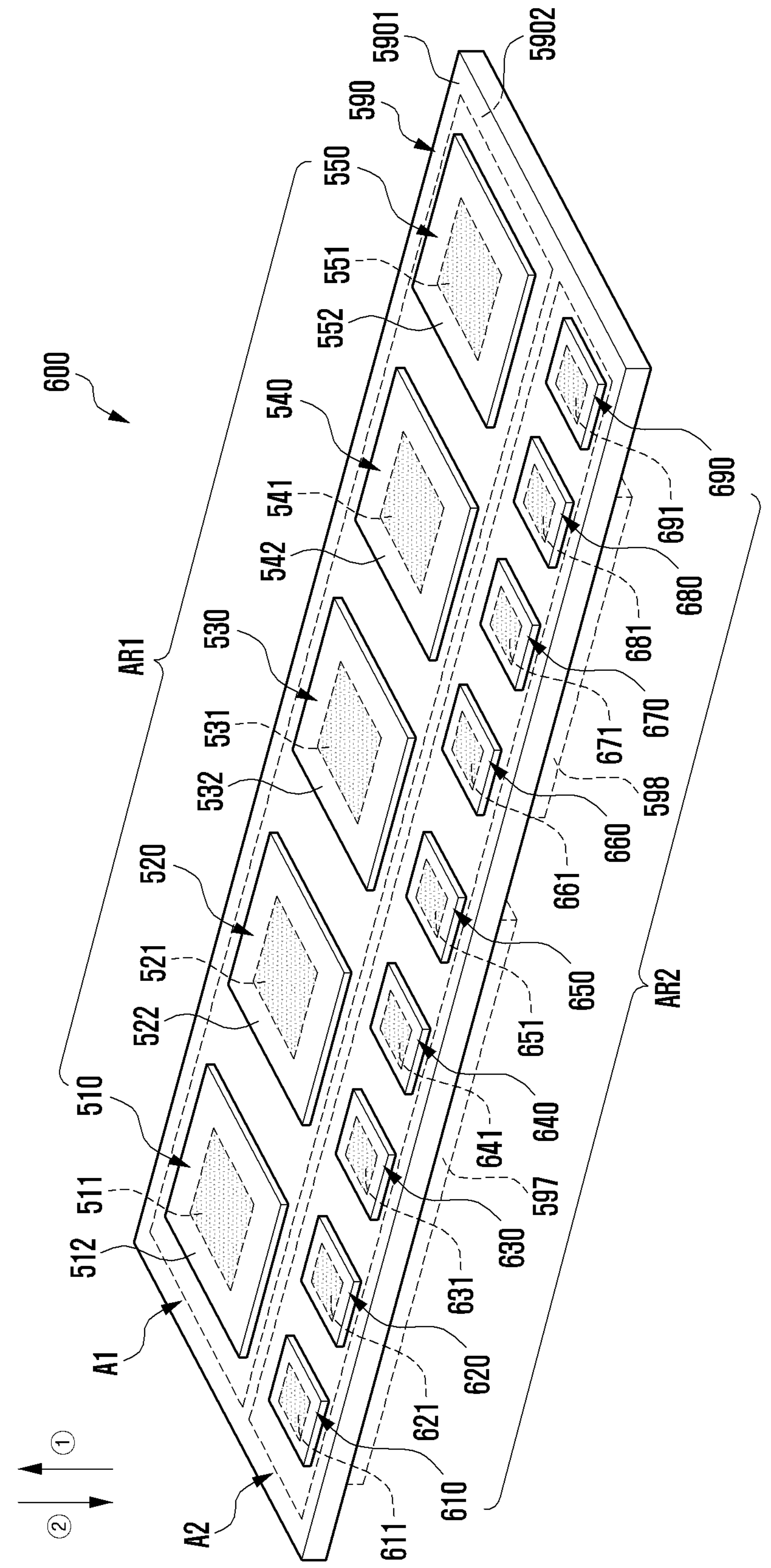
FIG. 7 is a perspective view of the antenna structure according to various embodiments.

FIG. 7 is a perspective view of an antenna structure according to various embodiments.

The antenna structure 600 of FIG. 7 may be at least partially similar to the third antenna module 246 of FIG. 2, or may further include various embodiments of the antenna structure.

In describing the antenna structure 600 of FIG. 7, the same reference numerals are assigned to the components substantially the same as those of the antenna structure 500 of FIGS. 5A, 5B and 5C, and a detailed description thereof may not be repeated.

Referring to FIG. 7, the antenna structure 600 may include a substrate 590 and a first array antenna AR1 (e.g., the array antenna AR1 in FIG. 5B) and a second array antenna AR2 disposed on the substrate 590. According to an embodiment, the substrate 590 may include a first substrate surface 5901 oriented in a first direction (direction ①) and a second substrate surface 5902 oriented in a second direction (direction ②) opposite to the first direction (direction ①). According to an embodiment, the first array antenna AR1 may include, in a first region A1 of the first substrate surface 5901, a first plurality of chip antennas 510, 520, 530, 540, and 550 disposed at a predetermined interval. According to an embodiment, the plurality of first chip antennas 510, 520, 530, 540, and 550 may include a first chip antenna 510, a second chip antenna 520, a third chip antenna 530, a fourth chip antenna 540, and a fifth chip antenna 550, which are disposed at a predetermined interval with respect to each other. According to an embodiment, the plurality of first chip antennas 510, 520, 530, 540, and 550 may include conductive patches 511, 521, 531, 541, and 551, respectively. According to an embodiment, the plurality of first chip antennas 510, 520, 530, 540, and 550 are electrically connected to a first wireless communication circuit 597 disposed on the second substrate surface 5902 of the substrate 590. For example, the first wireless communication circuit 597 may be configured to transmit and/or receive a radio signal in a first frequency band via the first array antenna AR1. According to an embodiment, the first frequency band may include a frequency band in the range of about 25 GHz to 45 GHz (e.g., mmWave).

According to various embodiments, the second array antenna AR2 may include, in a second region A2 different from the first region A1 of the first substrate surface 5901, a plurality of second chip antennas 610, 620, 630, 640, 650, 660, 670, 680, and 690 disposed at a predetermined interval. According to an embodiment, the plurality of second chip antennas 610, 620, 630, 640, 650, 660, 670, 680, and 690 may include a sixth chip antenna 610, a seventh chip antenna 620, an eighth chip antenna 630, a ninth chip antenna 640, a tenth chip antenna 650, an eleventh chip antenna 660, a twelfth chip antenna 670, a thirteenth chip antenna 680, and a fourteenth chip antenna 690, which are disposed at a predetermined interval with respect to each other. According to an embodiment, the plurality of second chip antennas 610, 620, 630, 640, 650, 660, 670, 680 and 690 may include conductive patches 611, 621, 631, 641, 651, 661, 671, 681, and 691, respectively. According to an embodiment, the plurality of second chip antennas 610, 620, 630, 640, 650, 660, 670, 680, and 690 may be electrically connected to a second wireless communication circuit 598 disposed on the second substrate surface 5902 of the substrate 590. For example, the second wireless communication circuit 598 may be configured to transmit and/or receive a radio signal in a second frequency band different from the first frequency band via the second array antenna AR2. According to an embodiment, the second frequency band may include a frequency band in the range of about 60 GHz (e.g., 802.11ay). According to an embodiment, the plurality of first chip antennas 510, 520, 530, 540, and 550 and the plurality of second chip antennas 610, 620, 630, 640, 650, 660, 670, 680, and 690 may have substantially the same structure and substrate arrangement structure as the plurality of chip antennas illustrated in FIGS. 5A to 6 (e.g., the plurality of chip antennas 510, 520, 530, 540, and 550 in FIG. 5A). According to an embodiment, the numbers of the first chip antennas 510, 520, 530, 540, and 550 and the second chip antennas 610, 620, 630, 640, 650, 660, 670, 680, and 690 may not be limited.

In the antenna structure 600 according to various example embodiments of the disclosure, the first array antenna AR1 and the second array antenna AR2 operating in different frequency bands are disposed on a single substrate 590 in the form of a chip antenna. Thus, compared to the individual mounting of the two array antennas AR1 and AR2, the mounting space can be reduced, which may be helpful for slimming an electronic device.

Figure 8A:
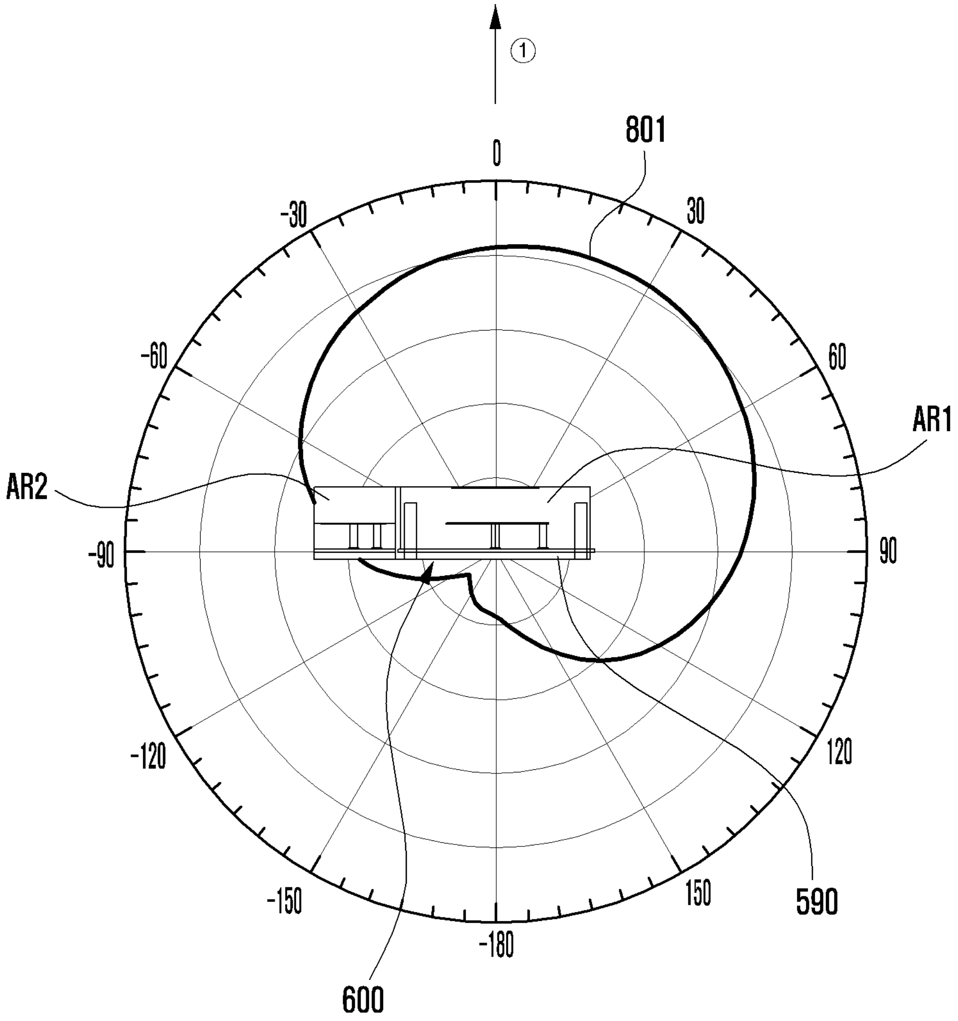
FIGS. 8A and 8B are diagrams illustrating radiation patterns of a first antenna array and a second antenna array in the antenna structure of FIG. 7 according to various embodiments.
Figure 8B:
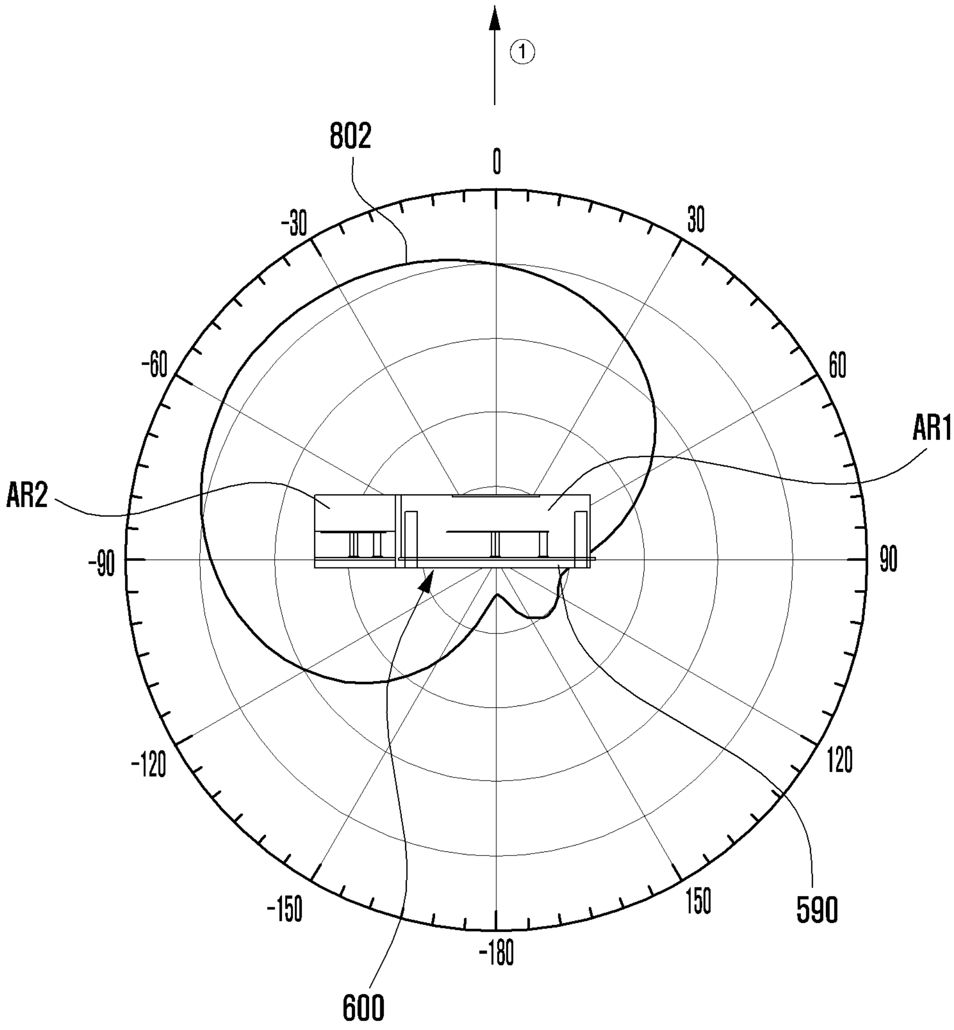

FIGS. 8A and 8B are diagrams illustrating radiation patterns of a first antenna array and a second antenna array in the antenna structure of FIG. 7 according to various embodiments.

Even if the first array antenna (AR1) and the second array antenna (AR2) included in the antenna structure 600 of FIG. 7 form beam patterns to be oriented in the first direction (direction ①), main beam pattern directions oriented in the first direction (direction ①) may be formed to be different from each other depending on the disposed positions of the array antennas on the substrate 590.

For example, as illustrated in FIG. 8A, it can be seen that the first array antenna AR1 forms a main radiation pattern 801 in the range of 0 degrees to 90 degrees in the first direction (direction ①) in which the substrate 590 is oriented, and as illustrated in FIG. 8B, it can be seen that the second array antenna AR2 forms a main radiation pattern 802 in the range of −0 degrees to −90 degrees in the first direction (direction ①) in which the substrate 590 is oriented. This may mean that the beam pattern formation direction may be determined in various directions depending on the position at which the antenna structure 600 including the two array antennas AR1 and AR2 are mounted in the inner space (e.g., the inner space 7001 in FIG. 9B) of the electronic device (e.g., the electronic device 700 in FIG. 9B).

Figure 9A:
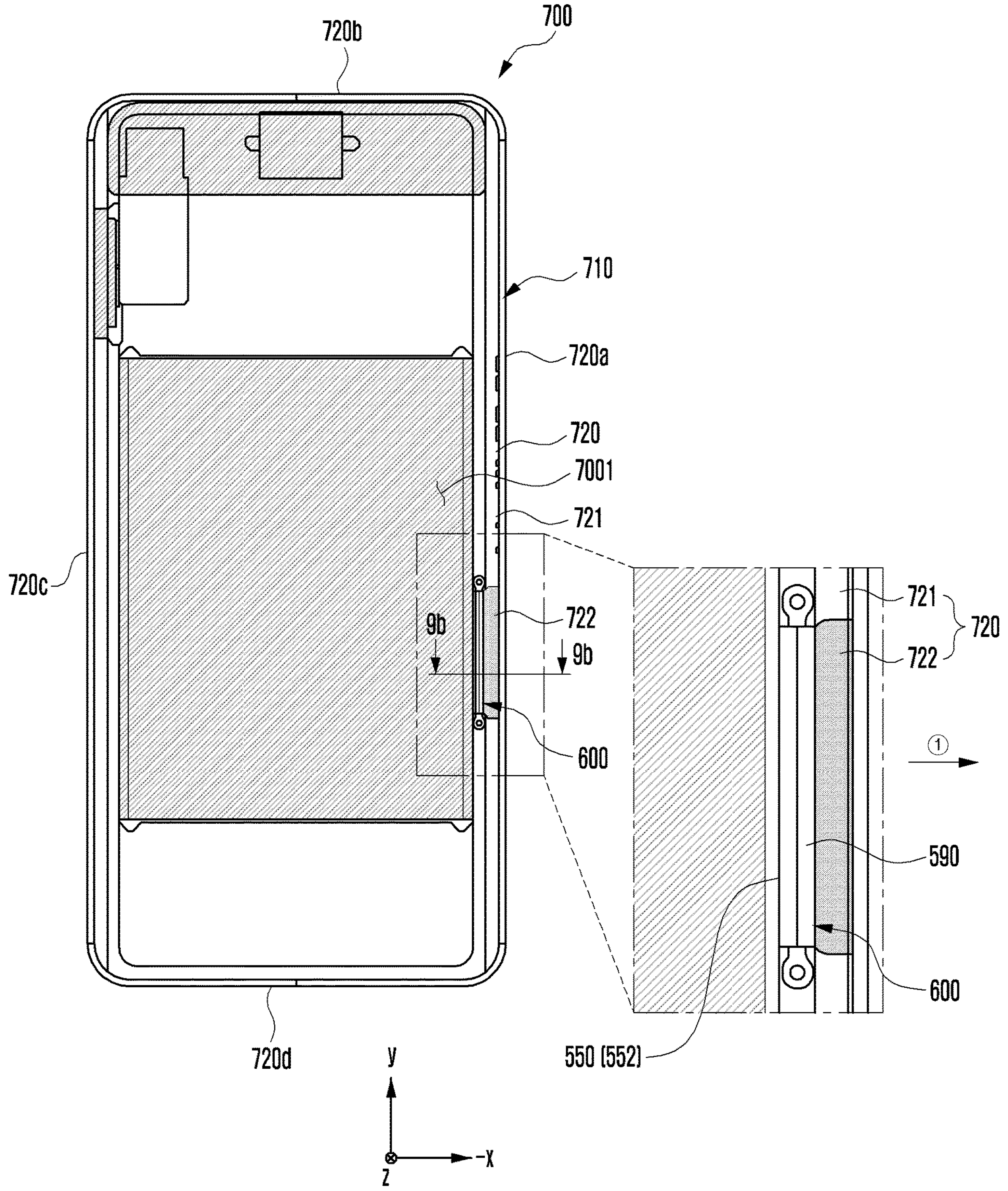
FIG. 9A is a diagram illustrating a portion of an electronic device illustrating an arrangement structure of an antenna structure to which a conductive member is applied according to various embodiments.
Figure 9B:
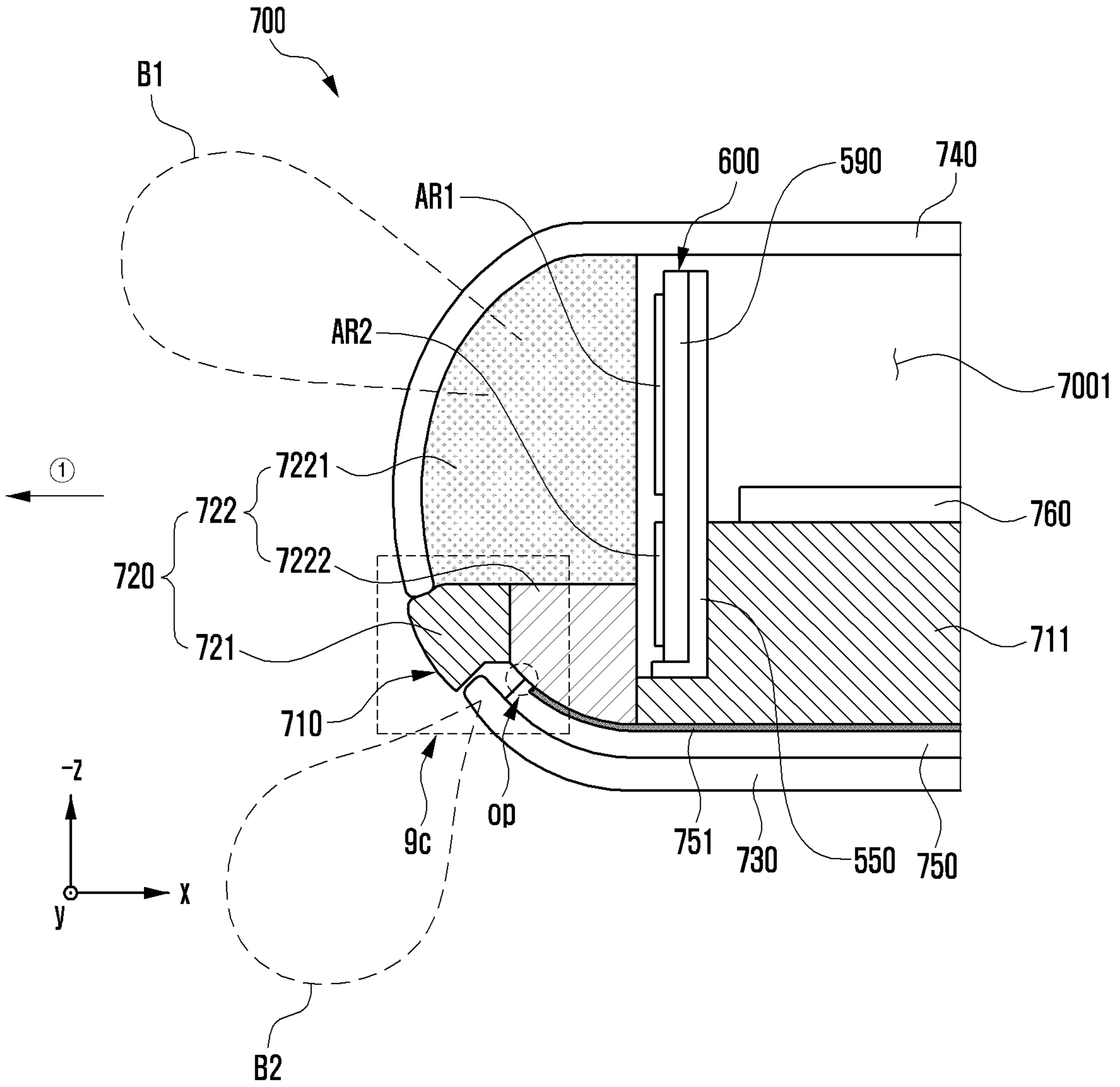
FIG. 9B is a partial cross-sectional view of the electronic device taken along line 9*b*-9*b* in FIG. 9A according to various embodiments.

FIG. 9A is a diagram illustrating a portion of an electronic device illustrating an arrangement structure of an antenna structure to which a conductive member is applied according to various embodiments. FIG. 9B is a partial cross-sectional view of the electronic device taken along line 9*b*-9*b* in FIG. 9A according to various embodiments.

The electronic device 700 of FIGS. 9A and 9B may be at least partially similar to the electronic device 101 of FIG. 1 or the electronic device 300 of FIGS. 3A to 3C, or may further include an embodiment of the electronic devices.

Referring to FIGS. 9A and 9B, the electronic device 700 may include a housing 710 (e.g., the housing 310 in FIG. 3A) including a front cover 730 (e.g., the front plate 302 of FIG. 3A) oriented in a first direction (e.g., the z-axis direction), a rear cover 740 (e.g., the rear plate 311 in FIG. 3B) oriented in a direction (e.g.,-z-axis direction) opposite to the front cover 730, and a side member 720 (e.g., the side bezel structure 320 in FIG. 3A) surrounding the space 7001 between the front cover 730 and the rear cover 740. According to an embodiment, the side surface member 720 may include a first side surface 720*a* having a first length in a predetermined direction (e.g., the y-axis direction), a second side surface 720*b* extending from the first side surface 720*a* in a direction (e.g., the x-axis direction) substantially perpendicular to the first side surface 720*a* and having a second length shorter than the first length, a third side surface 720*c* extending from the second side surface 720*b* substantially parallel to the first side surface 720*a* and having the first length, and a fourth side surface 720*d* extending from the third side surface 720*c* to the first side surface 720*a* substantially parallel to the second side surface 720*b* and having the second length. According to an embodiment, the side member 720 may include a conductive portion 721 that is at least partially disposed and a non-conductive portion 722 (e.g., a polymer portion) that is insert-injection-molded into the conductive portion 721. According to an embodiment, the non-conductive portion 722 may include a first non-conductive portion 7221 disposed to support at least a portion of the rear cover and a second non-conductive portion 7222 disposed to support at least a portion of the front cover and/or the display, with the conductive portion interposed therebetween. According to an embodiment, the first non-conductive portion 7221 and the second non-conductive portion 7222 may be made of the same dielectric material. In various embodiments, the first non-conductive portion 7221 and the second non-conductive portion 7222 may be made of dielectric materials having different dielectric constants. In various embodiments, the non-conductive portion 722 may be replaced with a space or another dielectric material. In various embodiments, the non-conductive portion 722 may be structurally coupled to the conductive portion 721. According to an embodiment, the side member 720 may include a support member 711 (e.g., the first support member 3111 in FIG. 3C) extending from the side member 720 to at least a portion of the inner space 7001. According to an embodiment, the support member 711 may extend from the side member 720 into the inner space 7001 or may be provided by structural coupling with the side member 720. According to an embodiment, the support member 711 may extend from the conductive portion 721. According to an embodiment, the support member 711 may support at least a portion of the antenna structure 600 disposed in the inner space 7001. According to an embodiment, the support member 711 may be disposed to support at least a portion of the display 750. According to an embodiment, the display 750 may be disposed to be visible from the outside through at least a portion of the front cover 730.

According to various embodiments, the antenna structure 500 may include a substrate 590, a first array antenna AR1 including a plurality of first chip antennas (e.g., the plurality of first chip antennas 510, 520, 530, 540, and 550 in FIG. 7) disposed on the substrate 590, and a second array antenna AR2 including a plurality of second chip antennas (e.g., the plurality of second chip antennas 610, 620, 630, 640, 650, 660, 670, 680, and 690 of FIG. 7). According to an embodiment, the antenna structure 600 may be disposed such that the array antennas AR1 and AR2 form a beam pattern substantially in a first direction (direction OD) in which the side member 720 is oriented. According to an embodiment, the antenna structure 600 may be disposed such that the first array antenna AR1 corresponds to the first non-conductive portion 7221 and the second array antenna AR2 corresponds to the second non-conductive portion 7222. In this case, the antenna structure 600 may be set such that a first beam pattern B1 is formed in a direction in which at least a portion of the first non-conductive portion 7221 and/or the rear cover 740 is oriented via the first array antenna AR1. According to an embodiment, the antenna structure 600 may be set such that a second beam pattern B2 is formed through an opening OP between the conductive plate 751 of the display 750 and the conductive portion 721 in a direction in which at least a portion of the second non-conductive portion 7222 and/or the front cover 730 is directed, via the second array antenna AR2. In various embodiments, since the second non-conductive portion 7222 is made of a material having a high dielectric constant (e.g., ceramic) to lower a cutoff frequency, it is possible to cause the second beam pattern B2 to be smoothly formed through the relatively small opening OP. For example, the opening OP (e.g., the opening 7222*a* in FIG. 9C) may have a shape (e.g., a slit shape) having a length in a direction parallel to the longitudinal direction of the substrate 590. In this case, the dielectric constant of the second non-conductive portion 7222 may be determined depending on the width of the opening OP (e.g., the width W in FIG. 9C) (e.g., the distance between the conductive plate 751 of the display 750 and the conductive portion 721). For example, when the array antenna operates in an operating frequency band of 50 GHz and the width of the opening OP (e.g., the distance between the conductive plate 751 of the display 750 and the conductive portion 721) is 1 mm, the second non-conductive portion 7222 may be made of a material having a dielectric constant of 7 or more.

Figure 9C:
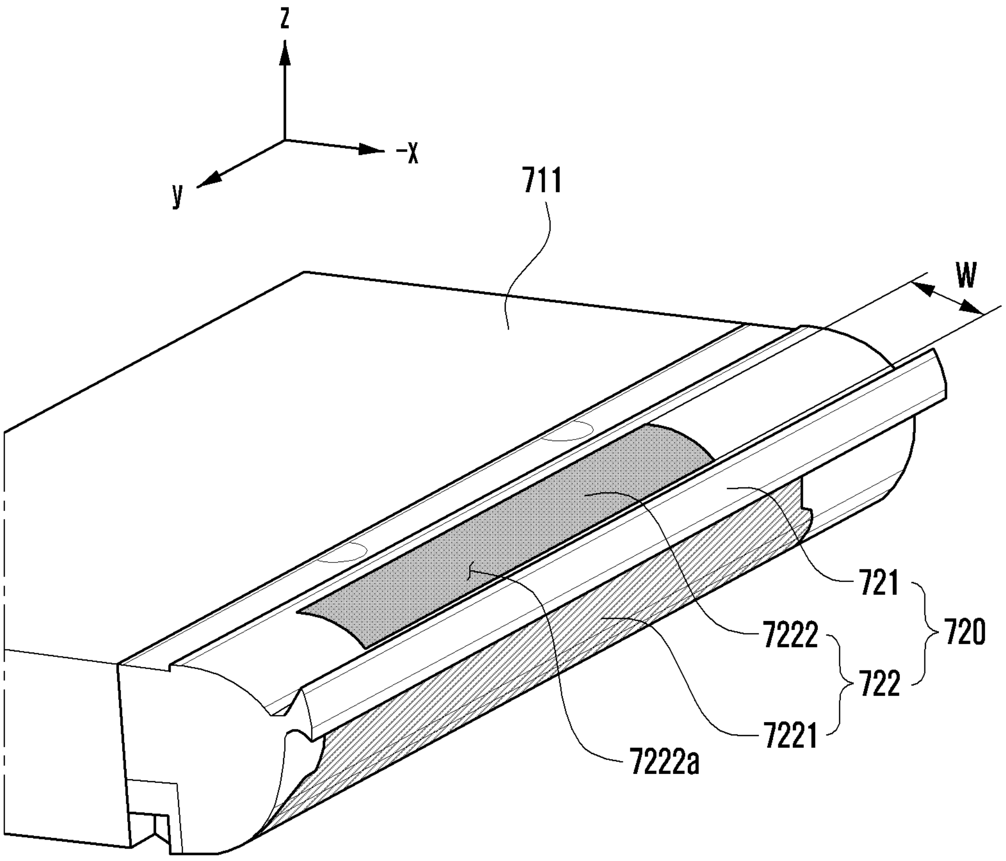
FIG. 9C is a partial perspective view of a side member illustrating the region 9*c* of FIG. 9B according to various embodiments.

FIG. 9C is a partial perspective view of a side member illustrating the region 9*c* of FIG. 9B according to various embodiments.

Referring to FIG. 9C, the side member 720 may include a conductive portion 721 and a non-conductive portion 722 disposed, with the conductive portion 721 interposed therebetween. According to an embodiment, the conductive portion 721 and/or the non-conductive portion 722 may be formed of at least a portion of a side surface (e.g., the side surface 310C in FIG. 3A) of the electronic device 700 and may be at least partially used as the exterior of the electronic device 700. According to an embodiment, the non-conductive portion 722 may include a first conductive portion 7221 disposed on one side of the conductive portion 721 and a second non-conductive portion 7222 disposed on the other side of the conductive portion 721. According to an embodiment, the opening OP (refer to FIG. 9D) may be through an opening 7222*a* formed in the side member 720 and a dielectric material filling the opening 7222*a*. In various embodiments, the opening OP may be replaced with an empty space without a separate dielectric material. In various embodiments, the opening 7222*a* may be formed to have a length and width corresponding to those of the antenna structure 600, or may be replaced with a plurality of openings disposed to be spaced apart from each other at a predetermined interval. In this case, the plurality of openings may be helpful for smooth radiation of the second beam pattern B2 by being disposed at a position corresponding to at least one chip antenna among the plurality of second chip antennas (e.g., the plurality of second chip antennas 610, 620, 630, 640, 650, 660, 670, 680 and 690) of the second array antenna AR2.

The antenna structure 600 according to various example embodiments of the disclosure may include array antennas AR1 and AR2 disposed on one substrate 590, operating in different frequency bands, and at least partially including chip antennas and may be configured to form beam patterns in various directions through a structure intentionally disposed in the inner space 7001 of the electronic device 700, which may be helpful for improving the radiation performance of the antenna structure 600 and slimming the electronic device 700.

Figure 9D:
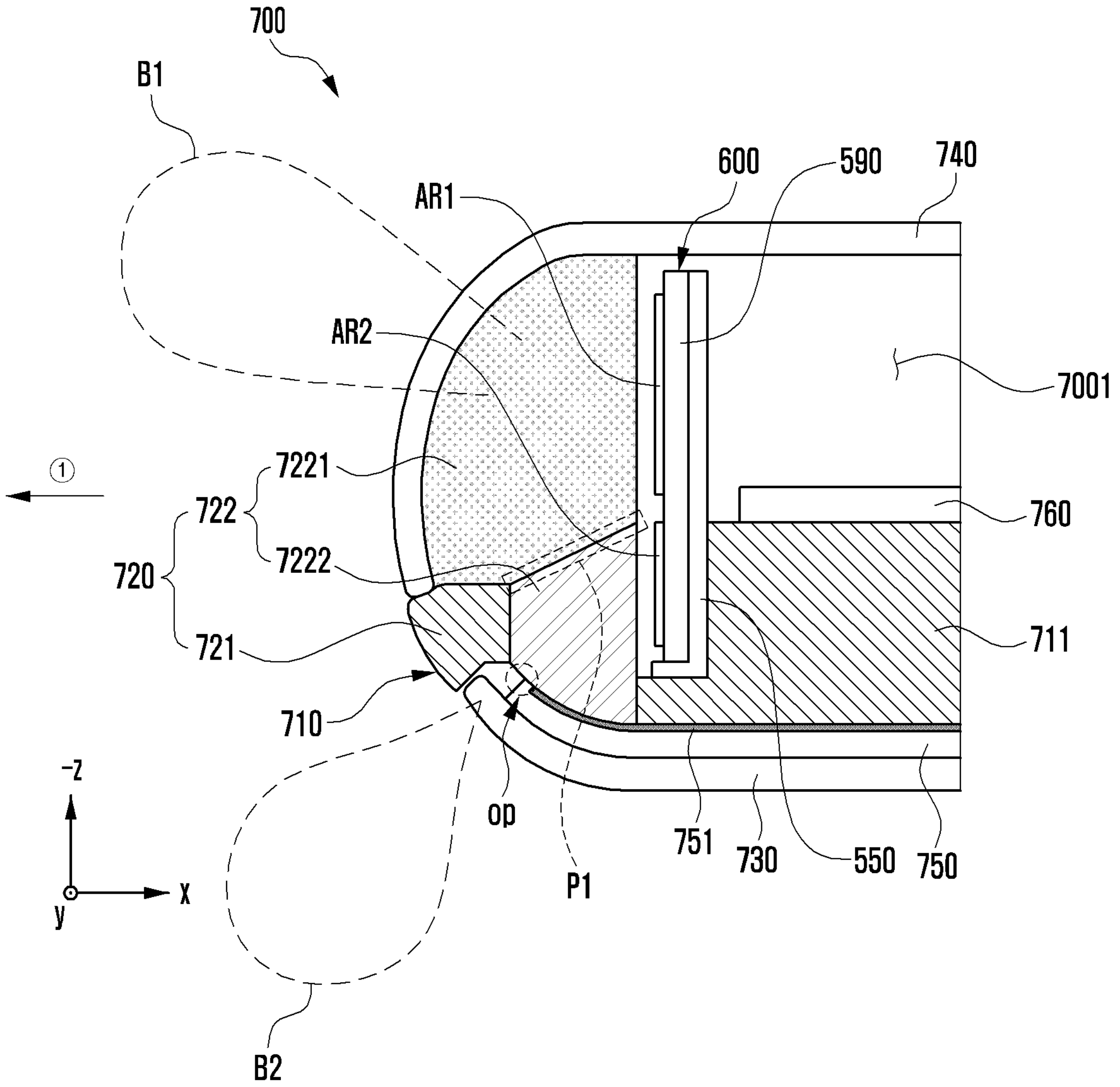
FIGS. 9D, 9E and 9F are partial cross-sectional views of an electronic device according to various embodiments.
Figure 9E:
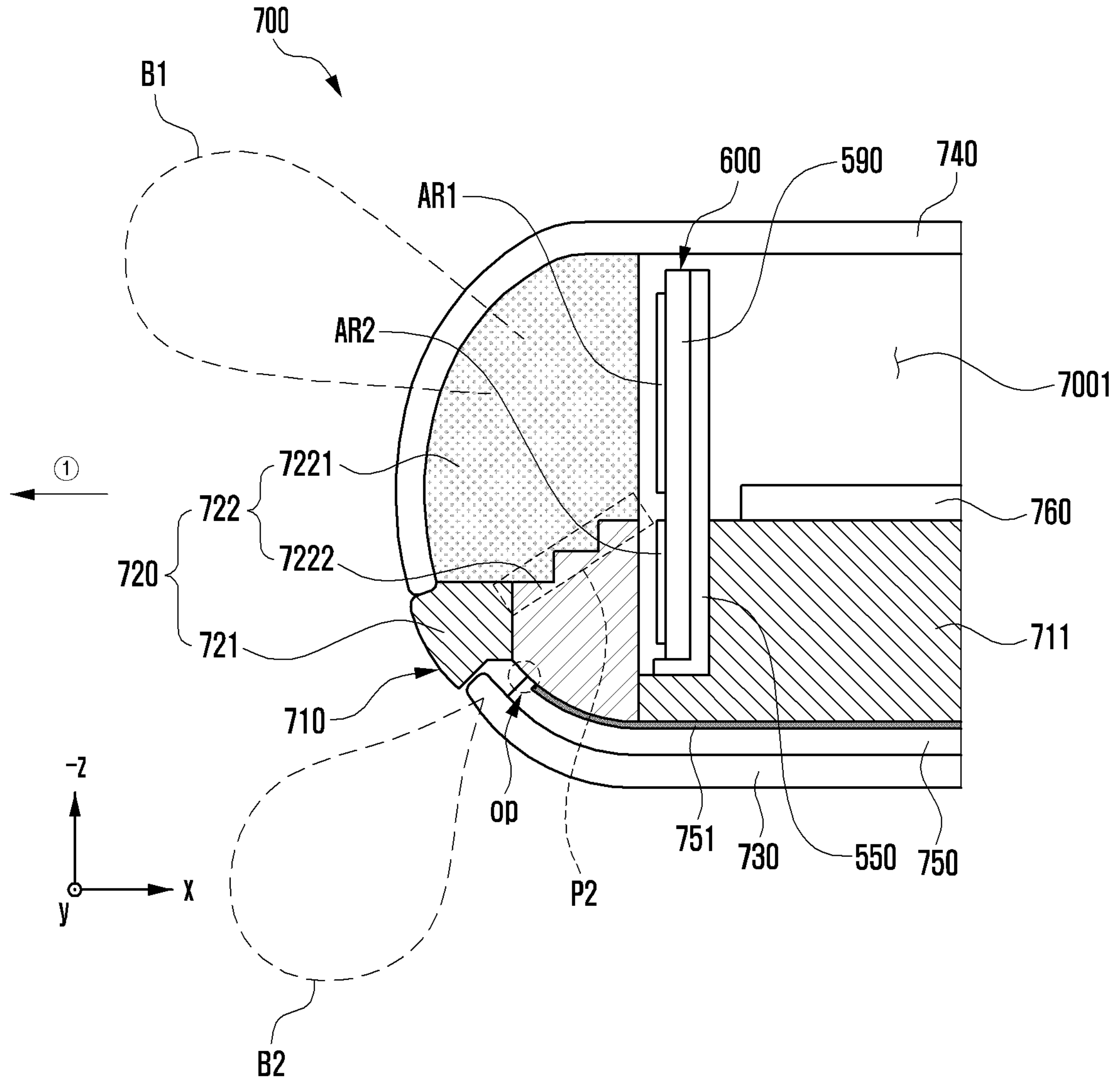
Figure 9F:
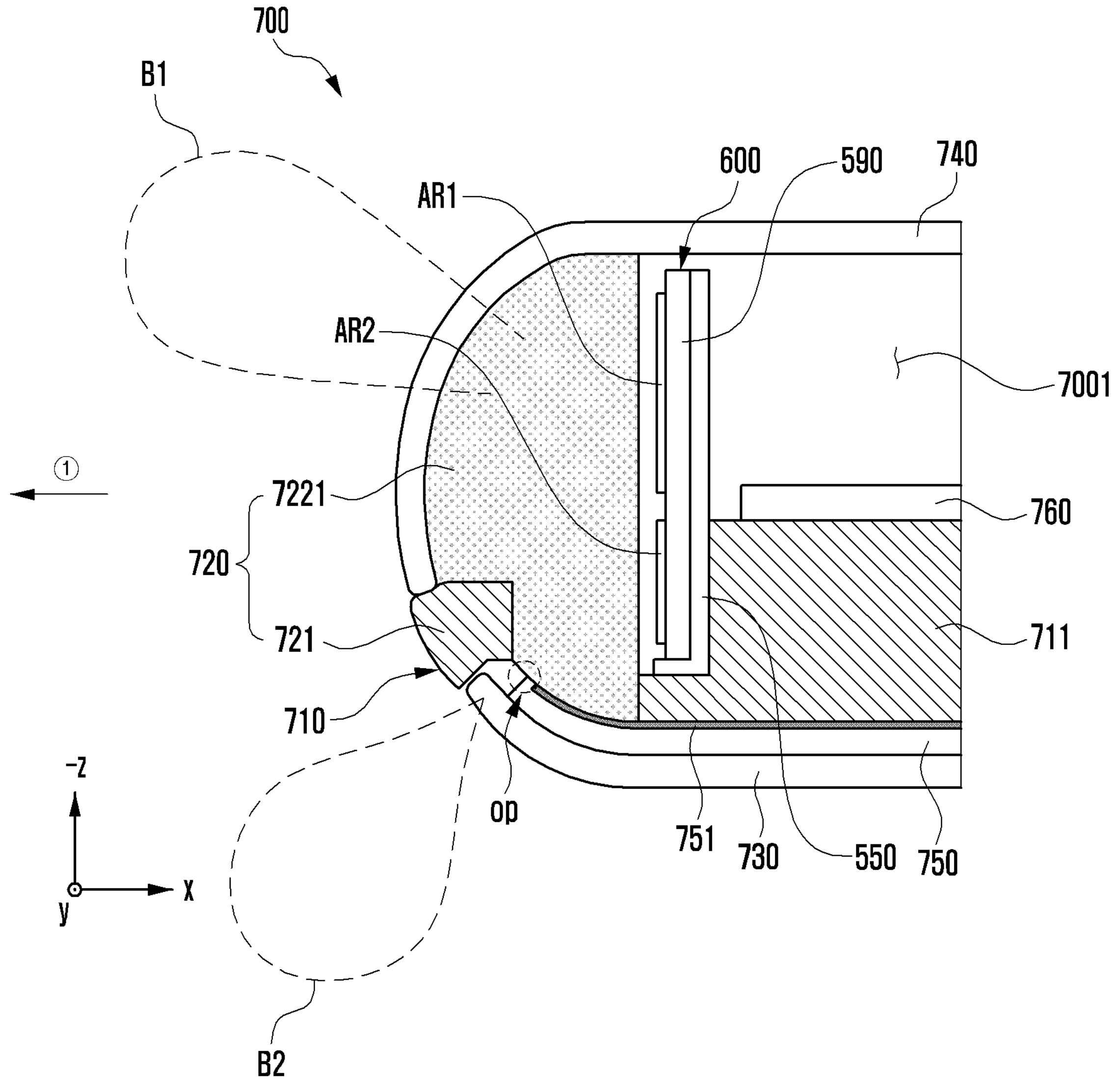

FIGS. 9D, 9E and 9F are partial cross-sectional views of an electronic device according to various embodiments.

In describing the electronic device of FIGS. 9D, 9E and 9F, the same reference numerals are assigned to components substantially the same as those of the electronic device of FIG. 9B, and a detailed description thereof may not be repeated.

Referring to FIG. 9D, a boundary region P1 between a first non-conductive portion 7221 and a second non-conductive portion 7222 may be formed to be inclined. For example, the boundary region P1 may include an inclined surface, the inclination of which gradually increases from the side member 720 toward the inner space 7001 (e.g., in the x-axis direction). According to an embodiment, through the inclined boundary region P1, the second non-conductive portion 7222 may be disposed at a position corresponding to the second array antenna AR2 as a whole. Accordingly, the inclined boundary area P1 may be helpful for improving isolation between the two beam patterns B1 and B2 by causing the first array antenna AR1 to form the first beam pattern B1 substantially through the first non-conductive portion 7221 and the second array antenna AR2 to form the second beam pattern B2 substantially through the second non-conductive portion 7222.

Referring to FIG. 9E, the boundary region P1 between the first non-conductive portion 7221 and the second non-conductive portion 7222 may be formed to be inclined. For example, the boundary region P2 may include an inclined region having a plurality of stepped portions, the heights of which gradually increase from the side member 720 toward the inner space 7001 (e.g., in the x-axis direction). According to an embodiment, through the inclined boundary region P2, the second non-conductive portion 7222 may be disposed at a position corresponding to the second array antenna AR2 as a whole. Accordingly, the inclined boundary area P2 may be helpful for improving isolation between the two beam patterns B1 and B2 by causing the first array antenna AR1 to form the first beam pattern B1 substantially through the first non-conductive portion 7221 and the second array antenna AR2 to form the second beam pattern B2 substantially through the second non-conductive portion 7222, and may also be helpful for reinforcing rigidity of the side member 720 according to the increase in a bonding force by increasing the bonded region between the first non-conductive portion 7221 and the second non-conductive portion 7222.

Referring to FIG. 9F, the side member 720 may include a conductive portion 721 and one non-conductive portion 7221 coupled to the conductive portion 721 and corresponding to the first array antenna AR1 and the second array antenna AR2. In this case, the non-conductive portion 7221 may include the above-described first non-conductive portion 7221. In various embodiments, the non-conductive portion 7221 may include the above-described second non-conductive portion 7222.

Figure 10A:
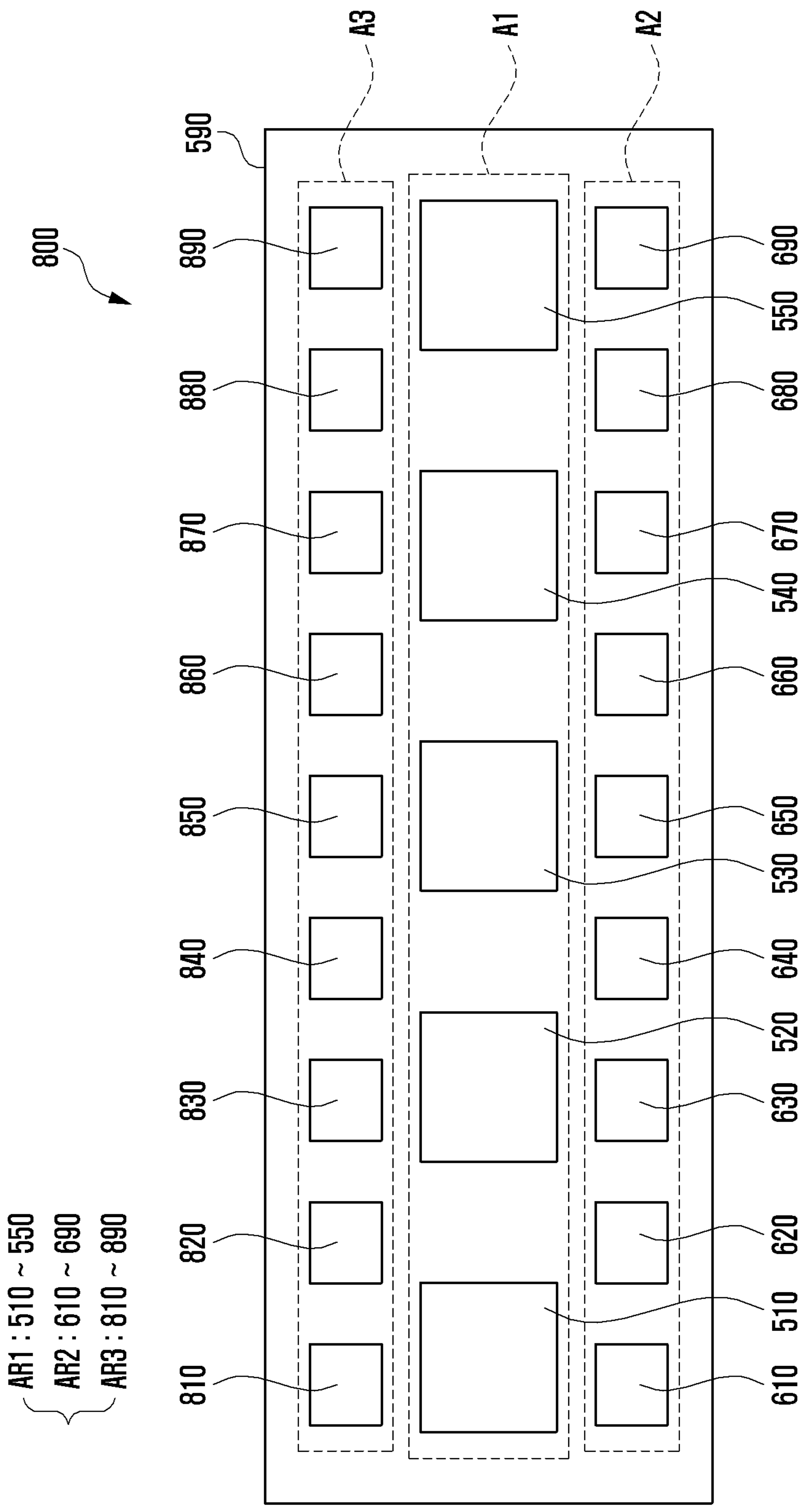
FIGS. 10A and 10B are diagrams illustrating example configurations of an antenna structure according to various embodiments.
Figure 10B:
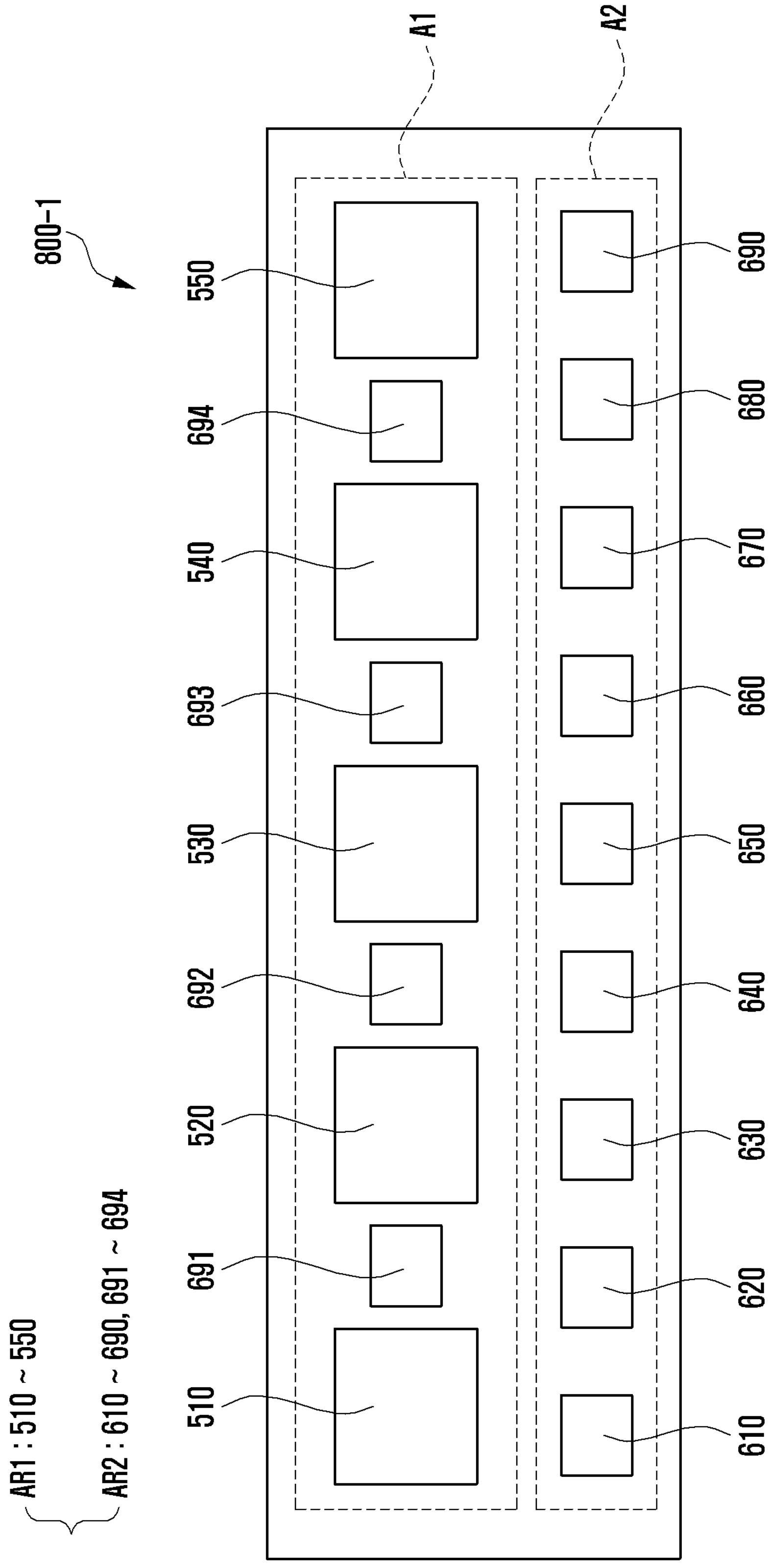

FIGS. 10A and 10B are diagrams illustrating example configurations of an antenna structure according to various embodiments.

The antenna structure 800 and 800-1 of FIGS. 10A and 10B may be at least partially similar to the third antenna module 246 of FIG. 2, or may further include various embodiments of the antenna structure.

In describing the antenna structure of FIGS. 10A and 10B, the same reference numerals are assigned to the components substantially the same as those of the antenna structure of FIG. 7, and a detailed description thereof may not be repeated.

Referring to FIG. 10A, the antenna structure 800 may include a substrate 590, and a first array antenna AR1 (e.g., the first array antenna AR1 in FIG. 7), a second array antenna AR2 (e.g., the second array antenna AR2 in FIG. 7), and a third array antenna AR3, which are disposed on the substrate 590. According to an embodiment, the first array antenna AR1 and the second array antenna AR2 may have substantially the same configuration as that of FIG. 7. According to an embodiment, the antenna structure 800 may include a third array antenna AR3 disposed in a third region A3 opposite to the second region A2 with the first region A1 interposed therebetween. According to an embodiment, the third array antenna AR3 may include a plurality of chip antennas 810, 820, 830, 840, 850, 860, 870, 880, and 890. According to an embodiment, the plurality of second chip antennas 810, 820, 830, 840, 850, 860, 870, 880, and 890 may include a fifteenth chip antenna 810, a sixteenth chip antenna 820, a seventeenth chip antenna 830, an eighteenth chip antenna 840, a nineteenth chip antenna 850, a twentieth chip antenna 860, a twenty-first chip antenna 870, a twenty-second chip antenna 880, and a twenty-third chip antenna 890, which are disposed at a predetermined interval with respect to each other. According to an embodiment, the third array antenna AR3 may be set to operate in substantially the same frequency band as the second array antenna AR2 (e.g., 802.11ay band). In various embodiments, the third array antenna AR3 may be configured to operate in substantially the same frequency band as the first array antenna AR1 (e.g., mmWave band).

Referring to FIG. 10B, the antenna structure 800 may include a substrate 590, and a first array antenna AR1 (e.g., the first array antenna AR1 in FIG. 7), a second array antenna AR2 (e.g., the second array antenna AR2 in FIG. 7), and additional chip antennas 691, 692, 693, and 694, which are disposed on the substrate 590. According to an embodiment, the first array antenna AR1 and the second array antenna AR2 may have substantially the same configuration as that of FIG. 7. According to an embodiment, the additional chip antennas 691, 692, 693, and 694 may include a fifteenth chip antenna 691 disposed in the space between the first chip antenna 510 and the second chip antenna 520 among the chip antennas 510, 520, 530, 540, and 550 of the first array antenna AR1), a sixteenth chip antenna 692 disposed in the space between the second chip antenna 520 and the third chip antenna 530, a seventeenth chip antenna 693 disposed in the space between the third chip antenna 530 and the fourth chip antenna 540, and an eighteenth chip antenna 694 disposed in the space between the fourth chip antenna 540 and the fifth chip antenna 550. According to an embodiment, the additional chip antennas 691, 692, 693, and 694 may be used as a part of the second array antenna AR2 operating in a predetermined frequency band (e.g., 802.11ay band).

Figure 11A:
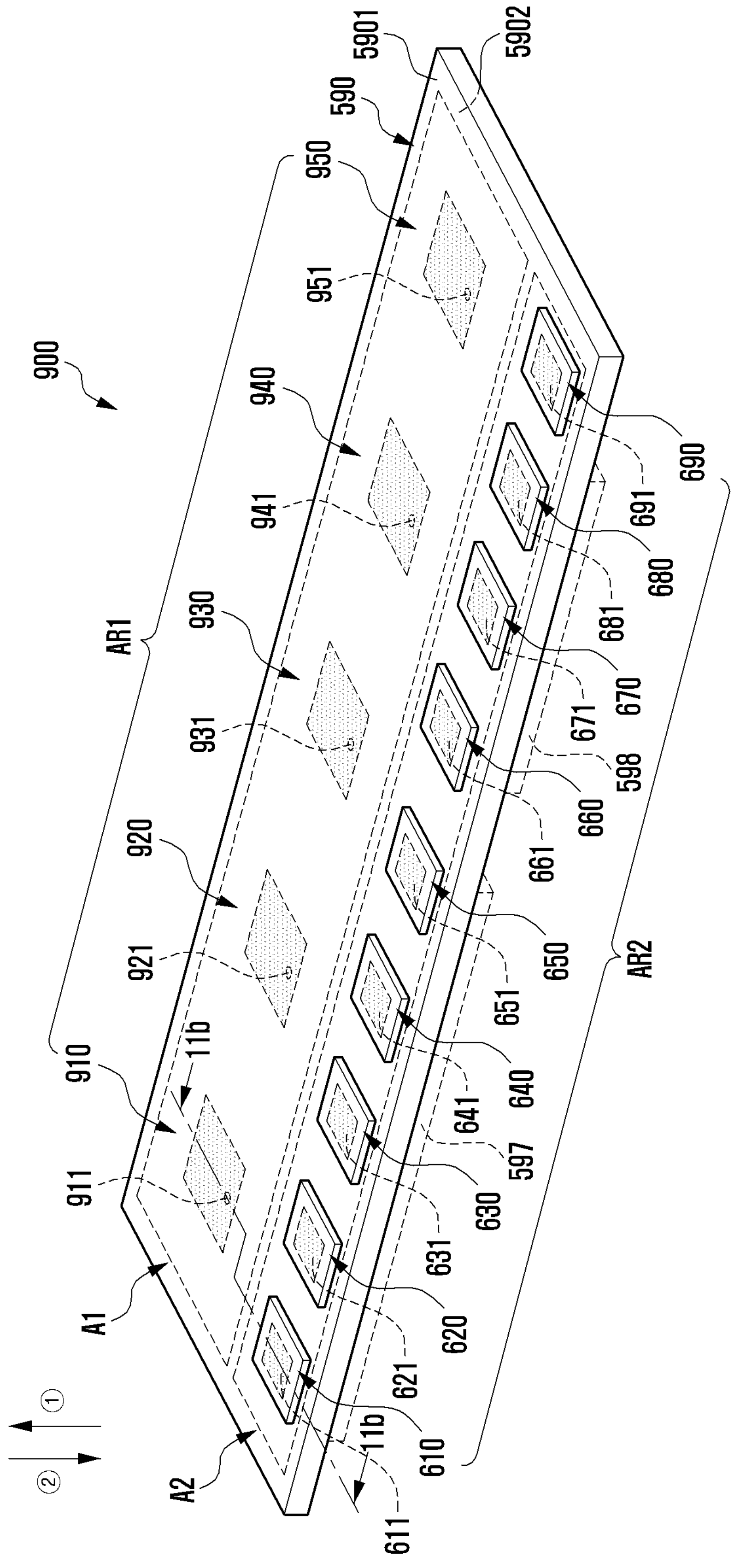
FIG. 11A is a perspective view of an antenna structure according to various embodiments.
Figure 11B:
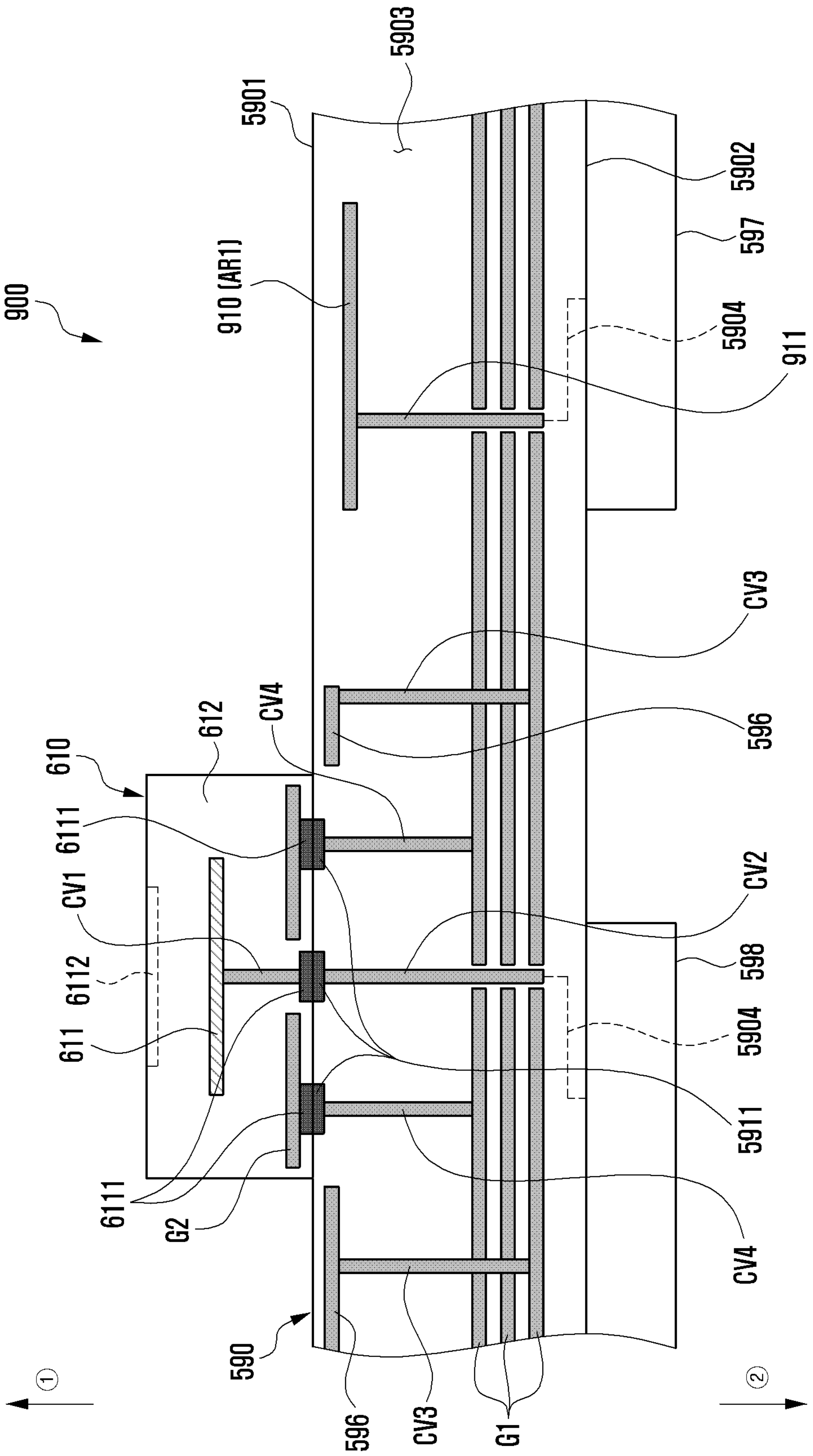
FIG. 11B is a partial cross-sectional view of the antenna structure taken along line 11*b*-11*b* in FIG. 11A according to various embodiments.

FIG. 11A is a perspective view of an antenna structure according to various embodiments. FIG. 11B is a partial cross-sectional view of the antenna structure taken along line 11*b*-11*b* in FIG. 11A according to various embodiments.

The antenna structure 900 of FIGS. 11A and 11B may be at least partially similar to the third antenna module 246 of FIG. 2, or may further include various embodiments of the antenna structure.

In describing the antenna structure 900 of FIGS. 11A and 11B, the same reference numerals are assigned to the components substantially the same as those of the antenna structure 600 of FIG. 7, and a detailed description thereof may not be repeated.

Referring to FIGS. 11A and 11B, the antenna structure 900 may include a first array antenna AR1 disposed in a first region A1 of a substrate 590 and a second array antenna AR2 disposed in a second region A2 different from the first region A1. According to an embodiment, the second array antenna AR2 may have substantially the same configuration as the second array antenna AR2 of FIG. 7. For example, the sixth chip antenna 610 of the second array antenna AR2 may include a rigid body 612 made of a high-dielectric constant material and a conductive patch 611 disposed inside the rigid body and electrically connected to the at least one first conductive pad 6111 exposed to the outer surface of the rigid body, via a first electrical connection structure CV1 (e.g., a conductive via). In various embodiments, the sixth chip antenna 610 may further include a conductive dummy patch 6112 disposed inside the rigid body to be coupled to the conductive patch 611. In various embodiments, the substrate 590 may further include a conductive layer 596 disposed to surround the plurality of chip antennas 610, 620, 630, 640, 650, 660, and 670 in the second region A2 when the first substrate surface 5901 is viewed from above. According to an embodiment, when the sixth chip antenna 610 is disposed on the first substrate surface 5901, the at least one first conductive pad 6111 is electrically connected to the at least one second conductive pad 5911 connected to the second wireless communication circuit 598 via a second electrical connection structure CV2 (e.g., a conductive via) inside the substrate and the wiring structure 5904, whereby the conductive patch 611 may be electrically connected to the second wireless communication circuit 598. According to an embodiment, the remaining chip antennas 620, 630, 640, 650, 660, 670, 680, and 690 included in the second antenna array AR2 may also be disposed on the first substrate surface 5901 of the substrate 590 in substantially the same manner, and may be electrically connected to the second wireless communication circuit 598.

According to various embodiments, the first array antenna AR1 may include a first conductive patch 910, a second conductive patch 920, a third conductive patch 930, a fourth conductive patch 940, and a fifth conductive patch 950, which are disposed in at least a portion of the insulating layer 5903 of the substrate 590 at a predetermined interval. According to an embodiment, the plurality of conductive patches 910, 920, 930, 940, and 950 may be electrically connected to the first wireless communication circuit 597 disposed on the second substrate surface 5902 via the feeding portions 911, 921, 931, 941, and 951 and the wiring structure 5904. According to an embodiment, the first conductive patch 910 may be disposed in the insulating layer 5903 of the substrate 590 at a position close (e.g., within a specified proximity) to the first substrate surface 5901 or may be disposed to be exposed to the first substrate surface 5901. According to an embodiment, the remaining conductive patches 920, 930, 940, and 950 may also be disposed on the substrate 590 in substantially the same manner.

According to various embodiments, the first wireless communication circuit 597 may be configured to transmit and/or receive a radio signal in a first frequency band (e.g., a frequency band in the range of about 25 GHz to 45 GHz (e.g., mmWave)) via the first array antenna AR1. According to an embodiment, the second wireless communication circuit 598 may be configured to transmit and/or receive a radio signal in a second frequency band (e.g., a frequency band of about 60 GHz (e.g., 802.11ay)) different from the first frequency band via the second array antenna AR2. According to an embodiment, the number of conductive patches 910, 920, 930, 940, 950 of the first array antenna AR1 and the number of chip antennas 610, 620, 630, 640, 650, 660, 670, 680, and 690 of the second array AR2 may not be limited. In various embodiments, the antenna structure 900 may be configured to operate in the second frequency band via the first array antenna AR1 and to operate in the first frequency band via the second array antenna AR2.

According to various example embodiments, an electronic device (e.g., the electronic device 300 in FIG. 1) may include: a housing (e.g., the housing 310 in FIG. 3A), an antenna structure including at least one antenna (e.g., the antenna structure 500 in FIG. 5A) disposed in the inner space of the housing, wherein the antenna structure includes:

a substrate (e.g., the substrate 590 in FIG. 5A) including a first substrate surface (e.g., the first substrate surface 5901 in FIG. 5A) oriented in a first direction (e.g., the first direction (e.g., direction ① in FIG. 5A) and a second substrate surface (e.g., the second substrate surface 5902 of FIG. 5A) oriented in a direction opposite to the first direction (e.g., the second direction (e.g., direction ② in FIG. 5A), and a first array antenna (e.g., the first array antenna AR1 in FIG. 5A) including a plurality of first chip antennas (e.g., the plurality of chip antennas 510, 520, 530, 540, and 550 in FIG. 5A) disposed in a first region of the first substrate surface at a specified interval, and a first wireless communication circuit disposed in the inner space and configured to transmit and/or receive a wireless signal of a first frequency band via the first array antenna (e.g., the wireless communication circuit 597 in FIG. 5A).

According to various example embodiments, the substrate may include a plurality of recesses formed lower than the first substrate surface to accommodate at least a portion of each of the plurality of first chip antennas.

According to various example embodiments, the substrate may include a conductive layer disposed to surround the plurality of first chip antennas on the first substrate surface or in an internal space within a specified proximity to the first substrate surface.

According to various example embodiments, the electronic device may further include: conductive walls disposed in the inner space of the substrate and disposed to separate each of the plurality of first chip antennas when the substrate surface is viewed from above.

According to various example embodiments, the conductive walls may be provided through a plurality of conductive vias formed in a direction from the first substrate surface to the second substrate surface in the inner space of the substrate.

According to various example embodiments, each of the plurality of first chip antennas may include a first rigid body comprising a high-dielectric constant material, and a first conductive patch disposed in the first rigid body and electrically connected to at least one first conductive pad that is at least partially exposed to an outer surface of the first rigid body.

According to various example embodiments, the first wireless communication circuit may be disposed on the second substrate surface, and the substrate may include at least one second conductive pad electrically connected to the first wireless communication circuit via a first wiring structure and exposed to the first substrate surface.

According to various example embodiments, the chip antenna may be fixed to the first substrate surface of the substrate of the substrate wherein the at least one first conductive pad and the at least one second conductive pad are soldered.

According to various example embodiments, the electronic device may further include: a second array antenna including a plurality of second chip antennas disposed at a specified interval in a second region different from the first region of the first substrate surface, and a second wireless communication circuit disposed in the inner space and configured to transmit and/or receive a wireless signal of a second frequency band via the second array antenna.

According to various example embodiments, each of the plurality of second chip antennas may include a second rigid body comprising a high-dielectric constant material, and a second conductive patch disposed in the second rigid body and electrically connected to at least one third conductive pad that is at least partially exposed to an outer surface of the second rigid body.

According to various example embodiments, the second wireless communication circuit may be disposed on the second substrate surface, and the substrate may include at least one fourth conductive pad electrically connected to the second wireless communication circuit via a second wiring structure and exposed to the first substrate surface.

According to various example embodiments, the chip antenna may be fixed to the first substrate surface of the substrate wherein the at least one third conductive pad and the at least one fourth conductive pad are soldered.

According to various example embodiments, the housing may include: a front cover, a rear cover oriented in a direction opposite to the front cover, and a side portion disposed to surround an inner space between the front cover and the rear cover and at least partially defining a side surface of the electronic device, wherein the antenna structure may be disposed such that the first substrate surface faces the side surface in the inner space.

According to various example embodiments, the side member may include: a conductive portion that at least partially defines an exterior of the electronic device, a first non-conductive portion disposed between the conductive portion and the rear cover, and a second non-conductive portion disposed between the conductive portion and the front cover.

According to various example embodiments, the second non-conductive portion may support the display and at least a portion of the front cover.

According to various example embodiments, the second non-conductive portion may comprise a material having a relatively higher dielectric constant than a dielectric constant of the first non-conductive portion.

According to various example embodiments, a first beam pattern formed through the first array antenna may be configured to be radiated through the first non-conductive portion, and a second beam pattern formed through the second array antenna may be configured to be radiated through the second non-conductive portion.

According to various example embodiments, the electronic device may further include: a display disposed in the inner space and disposed to be visible from outside of the front cover through at least a portion of the front cover.

According to various example embodiments, the second beam pattern may be configured to be radiated through the second non-conductive portion between the conductive portion and the display.

According to various example embodiments, the first frequency band may include a frequency range of 25 GHz to 45 GHz, and the second frequency band includes a frequency range of 55 GHz to 70 GHz.

The various example embodiments of the disclosure and drawings are provided merely to propose various examples to aid in understanding of the disclosure, and are not intended to limit the scope of the disclosure. Accordingly, the scope of the disclosure should be understood in such a manner that, in addition to the embodiments disclosed herein, all changes or modifications derived from the technical idea of the disclosure are included in the scope of the disclosure. It will be further understood that any embodiment(s) described herein may be used in conjunction with any other embodiment(s) described herein.

What is claimed is:

1. An electronic device comprising:

a housing;

a substrate disposed in the housing and including a first substrate surface facing a first direction and a second substrate surface oriented in a direction opposite to the first substrate surface;

a first array antenna disposed in at least a first region of the substrate, the first array antenna being disposed on the first substrate surface and/or being disposed at a position close to the first substrate surface in a space between the first substrate surface and the second substrate surface;

a first wireless communication circuit disposed in the space and configured to transmit and/or receive a wireless signal of a first frequency band via the first array antenna;

a second array antenna disposed in at least a second region different from the first region of the substrate, the second array antenna being disposed on the first substrate surface and/or being disposed at a position close to the first substrate surface in the space; and a second wireless communication circuit disposed in the inner space and configured to transmit and/or receive a wireless signal of a second frequency band different from the first frequency band via the second array antenna, wherein beam pattern directions of the first array antenna and the second array antenna are configured to be oriented in the first direction, wherein the first array antenna is configured to form a main radiation pattern in a first range, wherein the second array antenna is configured to form a main radiation pattern in a second range, and wherein the first and second ranges at least partially overlap.

2. The electronic device of claim 1, wherein the first array antenna includes a plurality of first chip antennas disposed on the first substrate surface, and wherein the substrate includes a plurality of recesses formed lower than the first substrate surface configured to accommodate at least a portion of each of the plurality of first chip antennas.

3. The electronic device of claim 2, wherein the substrate includes a conductive layer disposed to surround the plurality of first chip antennas on the first substrate surface or in the space within a specified proximity to the first substrate surface.

4. The electronic device of claim 2, further comprising:

conductive walls disposed in the space of the substrate and disposed to separate each of the plurality of first chip antennas when the substrate surface is viewed from above.

5. The electronic device of claim 4, wherein the conductive walls are provided through a plurality of conductive vias formed in a direction from the first substrate surface to the second substrate surface in the space of the substrate.

6. The electronic device of claim 2, wherein each of the plurality of first chip antennas includes:

a first rigid body comprising a high-dielectric constant material; and a first conductive patch disposed in the first rigid body and electrically connected to at least one first conductive pad that is at least partially exposed to an outer surface of the first rigid body.

7. The electronic device of claim 6, wherein the first wireless communication circuit is disposed on the second substrate surface, and the substrate includes at least one second conductive pad electrically connected to the first wireless communication circuit via a first wiring and exposed to the first substrate surface.

8. The electronic device of claim 7, wherein each of the plurality of first chip antennas is fixed to the first substrate surface, and wherein the at least one first conductive pad and the at least one second conductive pad are soldered.

9. The electronic device of claim 2, wherein the second array antenna includes a plurality of second chip antennas disposed on the first substrate surface, and wherein each of the plurality of second chip antennas includes:

a second rigid body comprising a high-dielectric constant material; and a second conductive patch disposed in the second rigid body and electrically connected to at least one third conductive pad that is at least partially exposed to an outer surface of the second rigid body.

10. The electronic device of claim 9, wherein the second wireless communication circuit is disposed on the second substrate surface, and the substrate includes at least one fourth conductive pad electrically connected to the second wireless communication circuit via a second wiring structure and exposed to the first substrate surface.

11. The electronic device of claim 10, wherein each of the second chip antennas is fixed to the first substrate surface of the substrate, and wherein the at least one third conductive pad and the at least one fourth conductive pad are soldered.

12. The electronic device of claim 1, wherein the housing includes:

a front cover;

a rear cover oriented in a direction opposite to the front cover; and a side member disposed to surround an inner space between the front cover and the rear cover and at least partially defining a side surface of the electronic device, wherein the substrate is disposed such that the first substrate surface faces the side surface in the inner space.

13. The electronic device of claim 12, wherein the side member includes:

a conductive portion at least partially defining an external appearance of the electronic device;

a first non-conductive portion disposed between the conductive portion and the rear cover, the first non-conductive portion corresponding to the first array antenna; and a second non-conductive portion disposed between the conductive portion and the front cover, the second non-conductive portion corresponding to the second array antenna.

14. The electronic device of claim 13, wherein the second non-conductive portion supports a display and at least a portion of the front cover.

15. The electronic device of claim 14, wherein the second non-conductive portion comprises a material having a relatively higher dielectric constant than a dielectric constant of the first non-conductive portion.

16. The electronic device of claim 1, wherein the first frequency band includes a frequency range of 25 GHz to 45 GHZ, and the second frequency band includes a frequency range of 55 GHz to 70 GHz.

17. An electronic device comprising:

a housing including a front cover, a rear cover oriented in a direction opposite to the front cover, and a side member disposed to surround an inner space between the front cover and the rear cover and at least partially defining a side surface of the electronic device;

an antenna structure disposed in the inner space of the housing, wherein the antenna structure includes:

a substrate including a first substrate surface and a second substrate surface oriented in a direction opposite to the first substrate surface;

a first array antenna disposed in at least a first region of the substrate, the first array antenna being disposed on the first substrate surface and/or being disposed at a position close to the first substrate surface in a space between the first substrate surface and the second substrate surface; and a second array antenna disposed in at least a second region different from the first region of the substrate surface, the second array antenna being disposed on the first substrate surface and/or being disposed at a position close to the first substrate surface in the space; and a first wireless communication circuit disposed in the inner space and configured to transmit and/or receive a wireless signal of a first frequency band via the first array antenna, wherein the side member includes:

a conductive portion at least partially defining an external appearance of the electronic device;

a first non-conductive portion disposed between the conductive portion and the rear cover; and a second non-conductive portion disposed between the conductive portion and the front cover, wherein a first beam pattern formed through the first array antenna is configured to be radiated through the first non-conductive portion, and a second beam pattern formed through the second array antenna is configured to be radiated through the second non-conductive portion.

18. The electronic device of claim 17, further comprising:

a display disposed in the inner space and disposed to be visible from outside of the front cover through at least a portion of the front cover.

19. The electronic device of claim 18, wherein the second beam pattern is configured to be radiated through the second non-conductive portion between the conductive portion and the display.

* * * * *